(12) United States Patent
Stern et al.

(10) Patent No.: US 12,457,372 B2
(45) Date of Patent: Oct. 28, 2025

(54) APPARATUS AND METHODS FOR SELECTIVE ENFORCEMENT OF SECONDARY CONTENT VIEWING

(71) Applicant: Time Warner Cable Enterprises LLC, St. Louis, MO (US)

(72) Inventors: Peter Stern, Greenwich, CT (US); Michael L. LaJoie, Treasure Island, FL (US); Michael Angus, Santa Monica, CA (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 0 days.

(21) Appl. No.: 17/978,798

(22) Filed: Nov. 1, 2022

(65) Prior Publication Data
US 2023/0051743 A1   Feb. 16, 2023

Related U.S. Application Data

(62) Division of application No. 16/933,701, filed on Jul. 20, 2020, now Pat. No. 11,496,782, which is a
(Continued)

(51) Int. Cl.
*H04N 7/10* (2006.01)
*G06F 21/00* (2013.01)
(Continued)

(52) U.S. Cl.
CPC ....... *H04N 21/23611* (2013.01); *G06F 21/00* (2013.01); *H04N 21/222* (2013.01);
(Continued)

(58) Field of Classification Search
CPC ............. H04N 21/2361; H04N 21/222; H04N 21/2407; H04N 21/2665; H04N 21/2747;
(Continued)

(56) References Cited

U.S. PATENT DOCUMENTS

| 4,521,881 A | 6/1985 | Stapleford et al. |
|---|---|---|
| 4,546,382 A | 10/1985 | McKenna et al. |

(Continued)

FOREIGN PATENT DOCUMENTS

| CA | 2643806 C | 6/2013 |
|---|---|---|
| WO | WO-0110125 A1 | 2/2001 |

(Continued)

OTHER PUBLICATIONS

Cisco Intelligent Network Architecture for Digital Video—SCTE Cable-Tec Expo 2004 information page, Orange County Convention Center, Jun. 2004, 24 pages.

(Continued)

*Primary Examiner* — Gigi L Dubasky
(74) *Attorney, Agent, or Firm* — Patent Beach PC

(57) ABSTRACT

Methods and apparatus for selectively enforcing required insertion or viewing of secondary content, such as advertisements or promotions, in a content distribution network. In one embodiment, the network is a managed network (e.g., cable television, satellite, or the like), and the method includes identifying secondary content with a particular attribute or property (e.g., an advertisement that a user has watched before), and selectively enabling one or more "trick mode" functions relating to that secondary content. In one implementation, audio codes or watermarks are inserted into the secondary content and detected when the content is accessed or rendered; if the detected content matches a database or listing of previously played content for that user or premises, the trick mode functionality (e.g., FF or "skip") is enabled, thereby allowing the user to bypass the content.

20 Claims, 11 Drawing Sheets

Related U.S. Application Data division of application No. 15/853,468, filed on Dec. 22, 2017, now Pat. No. 10,721,504, which is a division of application No. 13/676,012, filed on Nov. 13, 2012, now Pat. No. 9,854,280.

(60) Provisional application No. 61/670,082, filed on Jul. 10, 2012.

(51) Int. Cl.

| | |
|---|---|
| *H04N 7/025* | (2006.01) |
| *H04N 21/222* | (2011.01) |
| *H04N 21/236* | (2011.01) |
| *H04N 21/24* | (2011.01) |
| *H04N 21/2668* | (2011.01) |
| *H04N 21/2747* | (2011.01) |
| *H04N 21/442* | (2011.01) |
| *H04N 21/643* | (2011.01) |
| *H04N 21/6587* | (2011.01) |
| *H04N 21/81* | (2011.01) |
| *H04N 21/8358* | (2011.01) |

(52) U.S. Cl.
CPC ..... *H04N 21/2407* (2013.01); *H04N 21/2668* (2013.01); *H04N 21/2747* (2013.01); *H04N 21/44204* (2013.01); *H04N 21/64322* (2013.01); *H04N 21/6587* (2013.01); *H04N 21/812* (2013.01); *H04N 21/8358* (2013.01)

(58) Field of Classification Search
CPC ....... H04N 21/44204; H04N 21/64322; H04N 21/6587; H04N 21/812; H04N 21/8358
See application file for complete search history.

(56) References Cited

U.S. PATENT DOCUMENTS

| | | |
|---|---|---|
| 4,602,279 A | 7/1986 | Freeman |
| 4,905,080 A | 2/1990 | Watanabe et al. |
| 4,930,120 A | 5/1990 | Baxter et al. |
| 5,155,591 A | 10/1992 | Wachob |
| 5,313,454 A | 5/1994 | Bustini et al. |
| 5,373,315 A | 12/1994 | Dufresne et al. |
| 5,481,294 A | 1/1996 | Thomas et al. |
| 5,497,185 A | 3/1996 | Dufresne et al. |
| 5,600,364 A | 2/1997 | Hendricks et al. |
| 5,673,253 A | 9/1997 | Shaffer |
| 5,675,647 A | 10/1997 | Garneau et al. |
| RE35,651 E | 11/1997 | Bradley et al. |
| 5,734,380 A | 3/1998 | Adams et al. |
| 5,758,257 A | 5/1998 | Herz et al. |
| 5,774,170 A | 6/1998 | Hite et al. |
| 5,793,409 A | 8/1998 | Tetsumura |
| 5,793,410 A | 8/1998 | Rao |
| 5,812,642 A | 9/1998 | Leroy |
| 5,815,662 A | 9/1998 | Ong |
| 5,862,312 A | 1/1999 | Mann et al. |
| 5,878,324 A | 3/1999 | Borth et al. |
| 5,884,037 A | 3/1999 | Aras et al. |
| 5,914,945 A | 6/1999 | Abu-Amara et al. |
| 5,926,205 A | 7/1999 | Krause et al. |
| 5,929,849 A | 7/1999 | Kikinis |
| 5,935,206 A | 8/1999 | Dixon et al. |
| 5,956,037 A | 9/1999 | Osawa et al. |
| 5,963,844 A | 10/1999 | Dail |
| 5,974,299 A | 10/1999 | Massetti |
| 6,002,393 A | 12/1999 | Hite et al. |
| 6,029,045 A | 2/2000 | Picco et al. |
| 6,047,327 A | 4/2000 | Tso et al. |
| 6,081,830 A | 6/2000 | Schindler |
| 6,088,722 A | 7/2000 | Herz et al. |
| 6,092,178 A | 7/2000 | Jindal et al. |
| 6,105,134 A | 8/2000 | Pinder et al. |
| 6,124,878 A | 9/2000 | Adams et al. |
| 6,128,316 A | 10/2000 | Takeda et al. |
| 6,134,532 A | 10/2000 | Lazarus et al. |
| 6,157,377 A | 12/2000 | Shah-Nazaroff et al. |
| 6,161,142 A | 12/2000 | Wolfe et al. |
| 6,167,432 A | 12/2000 | Jiang |
| 6,169,728 B1 | 1/2001 | Perreault et al. |
| 6,175,856 B1 | 1/2001 | Riddle |
| 6,177,931 B1 | 1/2001 | Alexander et al. |
| 6,182,050 B1 | 1/2001 | Ballard |
| 6,202,210 B1 | 3/2001 | Ludtke |
| 6,211,869 B1 | 4/2001 | Loveman et al. |
| 6,211,901 B1 | 4/2001 | Imajima et al. |
| 6,216,129 B1 | 4/2001 | Eldering |
| 6,216,152 B1 | 4/2001 | Wong et al. |
| 6,219,710 B1 | 4/2001 | Gray et al. |
| 6,219,840 B1 | 4/2001 | Corrigan et al. |
| 6,240,243 B1 | 5/2001 | Chen et al. |
| 6,240,553 B1 | 5/2001 | Son et al. |
| 6,252,964 B1 | 6/2001 | Wasilewski et al. |
| 6,256,393 B1 | 7/2001 | Safadi et al. |
| 6,272,176 B1 | 8/2001 | Srinivasan |
| 6,282,713 B1 | 8/2001 | Kitsukawa et al. |
| 6,330,609 B1 | 12/2001 | Garofalakis et al. |
| 6,337,715 B1 | 1/2002 | Inagaki et al. |
| 6,353,626 B1 | 3/2002 | Sunay et al. |
| 6,378,130 B1 | 4/2002 | Adams |
| 6,434,141 B1 | 8/2002 | Oz et al. |
| 6,446,261 B1 | 9/2002 | Rosser |
| 6,463,508 B1 | 10/2002 | Wolf et al. |
| 6,463,585 B1 | 10/2002 | Hendricks et al. |
| 6,467,089 B1 | 10/2002 | Aust et al. |
| 6,498,783 B1 | 12/2002 | Lin |
| 6,502,076 B1 | 12/2002 | Smith |
| 6,502,139 B1 | 12/2002 | Birk et al. |
| 6,516,412 B2 | 2/2003 | Wasilewski et al. |
| 6,549,718 B1 | 4/2003 | Grooters et al. |
| 6,560,578 B2 | 5/2003 | Eldering |
| 6,571,102 B1 | 5/2003 | Hogberg et al. |
| 6,590,865 B1 | 7/2003 | Ibaraki et al. |
| 6,594,699 B1 | 7/2003 | Sahai et al. |
| 6,601,237 B1 | 7/2003 | Ten et al. |
| 6,604,138 B1 | 8/2003 | Virine et al. |
| 6,615,039 B1 | 9/2003 | Eldering |
| 6,615,251 B1 | 9/2003 | Klug et al. |
| 6,647,548 B1 | 11/2003 | Lu et al. |
| 6,651,103 B1 | 11/2003 | Markowitz et al. |
| 6,671,736 B2 | 12/2003 | Virine et al. |
| 6,681,393 B1 | 1/2004 | Bauminger et al. |
| 6,687,735 B1 | 2/2004 | Logston et al. |
| 6,700,624 B2 | 3/2004 | Yun |
| 6,704,930 B1 | 3/2004 | Eldering et al. |
| 6,718,551 B1 | 4/2004 | Swix et al. |
| 6,725,459 B2 | 4/2004 | Bacon |
| 6,728,269 B1 | 4/2004 | Godwin et al. |
| 6,728,840 B1 | 4/2004 | Shatil et al. |
| 6,738,978 B1 | 5/2004 | Hendricks et al. |
| 6,742,187 B1 | 5/2004 | Vogel |
| 6,745,245 B1 | 6/2004 | Carpenter |
| 6,763,391 B1 | 7/2004 | Ludtke |
| 6,771,290 B1 | 8/2004 | Hoyle |
| 6,772,435 B1 | 8/2004 | Thexton et al. |
| 6,775,843 B1 | 8/2004 | McDermott |
| 6,799,196 B1 | 9/2004 | Smith |
| 6,813,776 B2 | 11/2004 | Chernock et al. |
| 6,842,783 B1 | 1/2005 | Boivie et al. |
| 6,859,845 B2 | 2/2005 | Mate |
| 6,868,439 B2 | 3/2005 | Basu et al. |
| 6,891,841 B2 | 5/2005 | Leatherbury et al. |
| 6,898,762 B2 | 5/2005 | Ellis et al. |
| 6,901,606 B2 | 5/2005 | Wright et al. |
| 6,909,837 B1 | 6/2005 | Unger |
| 6,915,528 B1 | 7/2005 | McKenna, Jr. |
| 6,917,628 B2 | 7/2005 | McKinnin et al. |
| 6,944,166 B1 | 9/2005 | Perinpanathan et al. |
| 6,948,183 B1 | 9/2005 | Peterka |
| 6,961,430 B1 | 11/2005 | Gaske et al. |
| 6,981,045 B1 | 12/2005 | Brooks |
| 6,985,934 B1 | 1/2006 | Armstrong et al. |

(56) References Cited

U.S. PATENT DOCUMENTS

| | | |
|---|---|---|
| 6,986,156 B1 | 1/2006 | Rodriguez et al. |
| 6,990,680 B1 | 1/2006 | Wugofski |
| 7,010,801 B1 | 3/2006 | Jerding et al. |
| 7,012,891 B1 | 3/2006 | Chandran et al. |
| 7,017,179 B1 | 3/2006 | Asamoto et al. |
| 7,024,461 B1 | 4/2006 | Janning et al. |
| 7,024,676 B1 | 4/2006 | Klopfenstein |
| 7,027,460 B2 | 4/2006 | Iyer et al. |
| 7,039,116 B1 | 5/2006 | Zhang et al. |
| 7,039,169 B2 | 5/2006 | Jones |
| 7,039,614 B1 | 5/2006 | Candelore |
| 7,039,928 B2 | 5/2006 | Kamada et al. |
| 7,039,938 B2 | 5/2006 | Candelore |
| 7,047,309 B2 | 5/2006 | Baumann et al. |
| 7,058,387 B2 | 6/2006 | Kumar et al. |
| 7,069,573 B1 | 6/2006 | Brooks et al. |
| 7,075,945 B2 | 7/2006 | Arsenault et al. |
| 7,086,077 B2 | 8/2006 | Giammaressi |
| 7,089,577 B1 | 8/2006 | Rakib et al. |
| 7,093,272 B1 | 8/2006 | Shah-Nazaroff et al. |
| 7,100,183 B2 | 8/2006 | Kunkel et al. |
| 7,103,906 B1 | 9/2006 | Katz et al. |
| 7,107,462 B2 | 9/2006 | Fransdonk |
| 7,109,848 B2 | 9/2006 | Schybergson |
| 7,127,619 B2 | 10/2006 | Unger et al. |
| 7,133,837 B1 | 11/2006 | Barnes, Jr. |
| 7,143,431 B1 | 11/2006 | Eager et al. |
| 7,146,627 B1 | 12/2006 | Ismail et al. |
| 7,150,017 B1 | 12/2006 | Vogl et al. |
| 7,152,237 B2 | 12/2006 | Flickinger et al. |
| 7,155,508 B2 | 12/2006 | Sankuratripati et al. |
| 7,174,126 B2 | 2/2007 | McElhatten et al. |
| 7,174,385 B2 | 2/2007 | Li |
| 7,178,161 B1 | 2/2007 | Fristoe et al. |
| 7,181,010 B2 | 2/2007 | Russ et al. |
| 7,191,461 B1 | 3/2007 | Arsenault et al. |
| 7,194,756 B2 | 3/2007 | Addington et al. |
| 7,197,472 B2 | 3/2007 | Conkwright et al. |
| 7,200,788 B2 | 4/2007 | Hiraki et al. |
| 7,203,940 B2 | 4/2007 | Barmettler et al. |
| 7,207,055 B1 | 4/2007 | Hendricks et al. |
| 7,216,265 B2 | 5/2007 | Hughes et al. |
| 7,222,078 B2 | 5/2007 | Abelow |
| 7,225,164 B1 | 5/2007 | Candelore et al. |
| 7,225,458 B2 | 5/2007 | Klauss et al. |
| 7,228,555 B2 | 6/2007 | Schlack |
| 7,237,250 B2 | 6/2007 | Kanojia et al. |
| 7,246,150 B1 | 7/2007 | Donoho et al. |
| 7,246,172 B2 | 7/2007 | Yoshiba et al. |
| 7,246,366 B1 | 7/2007 | Addington et al. |
| 7,254,608 B2 | 8/2007 | Yeager et al. |
| 7,257,650 B2 | 8/2007 | Maciesowicz |
| 7,266,198 B2 | 9/2007 | Medvinsky |
| 7,266,611 B2 | 9/2007 | Jabri et al. |
| 7,266,726 B1 | 9/2007 | Ladd et al. |
| 7,266,836 B2 | 9/2007 | Anttila et al. |
| 7,274,661 B2 | 9/2007 | Harrell et al. |
| 7,280,737 B2 | 10/2007 | Smith |
| 7,281,261 B2 | 10/2007 | Jaff et al. |
| 7,283,803 B2 | 10/2007 | Karaoguz et al. |
| 7,305,691 B2 | 12/2007 | Cristofalo |
| 7,308,415 B2 | 12/2007 | Kimbrel et al. |
| 7,317,728 B2 | 1/2008 | Acharya et al. |
| 7,324,523 B2 | 1/2008 | Dacosta |
| 7,325,073 B2 | 1/2008 | Shao et al. |
| 7,327,692 B2 | 2/2008 | Ain et al. |
| 7,334,044 B1 | 2/2008 | Allen |
| 7,340,759 B1 | 3/2008 | Rodriguez |
| 7,346,688 B2 | 3/2008 | Allen et al. |
| 7,352,775 B2 | 4/2008 | Powell |
| 7,355,980 B2 | 4/2008 | Bauer et al. |
| 7,356,751 B1 | 4/2008 | Levitan |
| 7,363,371 B2 | 4/2008 | Kirby et al. |
| 7,363,643 B2 | 4/2008 | Drake et al. |
| 7,367,043 B2 | 4/2008 | Dudkiewicz et al. |
| 7,369,750 B2 | 5/2008 | Cheng et al. |
| 7,370,120 B2 | 5/2008 | Kirsch et al. |
| 7,376,386 B2 | 5/2008 | Phillips et al. |
| 7,379,494 B2 | 5/2008 | Raleigh et al. |
| 7,403,618 B2 | 7/2008 | Van et al. |
| 7,434,245 B1 | 10/2008 | Shiga et al. |
| 7,457,520 B2 | 11/2008 | Rosetti et al. |
| 7,464,179 B2 | 12/2008 | Hodges et al. |
| 7,567,565 B2 | 7/2009 | La |
| 7,574,726 B2 | 8/2009 | Zhang et al. |
| 7,577,118 B2 | 8/2009 | Haumonte et al. |
| 7,602,820 B2 | 10/2009 | Helms et al. |
| 7,603,529 B1 | 10/2009 | Machardy et al. |
| 7,617,516 B2 | 11/2009 | Huslak et al. |
| 7,690,020 B2 | 3/2010 | Lebar |
| 7,712,125 B2 | 5/2010 | Herigstad et al. |
| 7,720,432 B1 | 5/2010 | Colby et al. |
| 7,729,940 B2 | 6/2010 | Harvey et al. |
| 7,730,509 B2 | 6/2010 | Boulet et al. |
| 7,757,251 B2 | 7/2010 | Gonder et al. |
| 7,783,316 B1 | 8/2010 | Mitchell |
| 7,801,803 B2 | 9/2010 | Forlai |
| 7,836,178 B1 | 11/2010 | Bedell et al. |
| 7,900,229 B2 | 3/2011 | Dureau |
| 7,930,715 B2 | 4/2011 | Hendricks et al. |
| 7,954,131 B2 | 5/2011 | Cholas et al. |
| 8,028,322 B2 | 9/2011 | Riedl et al. |
| 8,042,131 B2 | 10/2011 | Flickinger |
| 8,065,703 B2 | 11/2011 | Wilson et al. |
| 8,099,757 B2 | 1/2012 | Riedl et al. |
| 8,156,520 B2 | 4/2012 | Casagrande et al. |
| 8,170,065 B2 | 5/2012 | Hasek et al. |
| 8,205,226 B2 | 6/2012 | Ko et al. |
| 8,214,256 B2 | 7/2012 | Riedl et al. |
| 8,296,185 B2 | 10/2012 | Isaac |
| 8,347,341 B2 | 1/2013 | Markley et al. |
| 8,365,212 B1 | 1/2013 | Orlowski |
| 8,365,213 B1 | 1/2013 | Orlowski |
| 8,396,055 B2 | 3/2013 | Patel et al. |
| 8,458,125 B1 | 6/2013 | Chong, Jr. et al. |
| 8,468,099 B2 | 6/2013 | Headings et al. |
| 8,516,529 B2 | 8/2013 | Lajoie et al. |
| 8,561,113 B2 | 10/2013 | Cansler et al. |
| 8,571,931 B2 | 10/2013 | Riedl et al. |
| 8,621,501 B2 | 12/2013 | Matheny et al. |
| 8,701,138 B2 | 4/2014 | Stern et al. |
| 8,713,623 B2 | 4/2014 | Brooks |
| 8,726,303 B2 | 5/2014 | Ellis, III |
| 8,769,559 B2 | 7/2014 | Moon et al. |
| 8,856,825 B1 | 10/2014 | Mick, Jr. et al. |
| 8,881,190 B1 * | 11/2014 | Rothschild ............. H04N 5/913 725/19 |
| 8,997,136 B2 | 3/2015 | Brooks et al. |
| 9,027,062 B2 | 5/2015 | Patel et al. |
| 9,215,423 B2 | 12/2015 | Kimble et al. |
| 9,479,807 B1 | 10/2016 | Bugajski et al. |
| 2001/0013123 A1 | 8/2001 | Freeman et al. |
| 2001/0030785 A1 | 10/2001 | Pangrac et al. |
| 2001/0050901 A1 | 12/2001 | Love et al. |
| 2002/0004912 A1 | 1/2002 | Fung |
| 2002/0019984 A1 | 2/2002 | Rakib |
| 2002/0026496 A1 | 2/2002 | Boyer et al. |
| 2002/0032754 A1 | 3/2002 | Logston et al. |
| 2002/0046404 A1 | 4/2002 | Mizutani |
| 2002/0049902 A1 | 4/2002 | Rhodes |
| 2002/0049980 A1 | 4/2002 | Hoang |
| 2002/0053082 A1 | 5/2002 | Weaver, III et al. |
| 2002/0054589 A1 | 5/2002 | Ethridge et al. |
| 2002/0059577 A1 | 5/2002 | Lu et al. |
| 2002/0059619 A1 | 5/2002 | Lebar |
| 2002/0063621 A1 | 5/2002 | Tseng et al. |
| 2002/0069404 A1 | 6/2002 | Copeman et al. |
| 2002/0073419 A1 | 6/2002 | Yen et al. |
| 2002/0078441 A1 | 6/2002 | Drake et al. |
| 2002/0078444 A1 | 6/2002 | Krewin et al. |
| 2002/0087975 A1 | 7/2002 | Schlack |
| 2002/0087976 A1 | 7/2002 | Kaplan et al. |
| 2002/0095684 A1 | 7/2002 | St. et al. |
| 2002/0100059 A1 | 7/2002 | Buehl et al. |

(56) References Cited

U.S. PATENT DOCUMENTS

| | | |
|---|---|---|
| 2002/0100063 A1 | 7/2002 | Herigstad et al. |
| 2002/0104083 A1 | 8/2002 | Hendricks et al. |
| 2002/0112240 A1 | 8/2002 | Bacso et al. |
| 2002/0120498 A1 | 8/2002 | Gordon et al. |
| 2002/0123928 A1 | 9/2002 | Eldering et al. |
| 2002/0124182 A1 | 9/2002 | Bacso et al. |
| 2002/0129378 A1 | 9/2002 | Cloonan et al. |
| 2002/0144262 A1 | 10/2002 | Plotnick et al. |
| 2002/0144263 A1 | 10/2002 | Eldering et al. |
| 2002/0147771 A1 | 10/2002 | Traversat et al. |
| 2002/0147984 A1 | 10/2002 | Tomsen et al. |
| 2002/0152299 A1 | 10/2002 | Traversat et al. |
| 2002/0154655 A1 | 10/2002 | Gummalla et al. |
| 2002/0162109 A1 | 10/2002 | Shteyn |
| 2002/0162115 A1 | 10/2002 | Bruckner et al. |
| 2002/0163928 A1 | 11/2002 | Rudnick et al. |
| 2002/0166119 A1 | 11/2002 | Cristofalo |
| 2002/0170057 A1 | 11/2002 | Barrett et al. |
| 2002/0174430 A1 | 11/2002 | Ellis et al. |
| 2002/0178445 A1 | 11/2002 | Eldering et al. |
| 2002/0178447 A1 | 11/2002 | Plotnick et al. |
| 2002/0184629 A1 | 12/2002 | Sie et al. |
| 2002/0184634 A1 | 12/2002 | Cooper |
| 2002/0184635 A1 | 12/2002 | Istvan |
| 2002/0194607 A1 | 12/2002 | Connelly |
| 2002/0196939 A1 | 12/2002 | Unger et al. |
| 2003/0002862 A1 | 1/2003 | Rodriguez et al. |
| 2003/0004810 A1 | 1/2003 | Eldering |
| 2003/0005056 A1 | 1/2003 | Yamamoto et al. |
| 2003/0005446 A1 | 1/2003 | Jaff et al. |
| 2003/0005453 A1 | 1/2003 | Rodriguez et al. |
| 2003/0005454 A1 | 1/2003 | Rodriguez et al. |
| 2003/0007516 A1 | 1/2003 | Abramov et al. |
| 2003/0018977 A1 | 1/2003 | McKenna |
| 2003/0020744 A1 | 1/2003 | Ellis et al. |
| 2003/0021412 A1 | 1/2003 | Candelore et al. |
| 2003/0025832 A1 | 2/2003 | Swart et al. |
| 2003/0028884 A1 | 2/2003 | Swart et al. |
| 2003/0030751 A1 | 2/2003 | Lupulescu et al. |
| 2003/0033199 A1 | 2/2003 | Coleman |
| 2003/0037068 A1 | 2/2003 | Thomas et al. |
| 2003/0046704 A1 | 3/2003 | Laksono et al. |
| 2003/0056217 A1 | 3/2003 | Brooks |
| 2003/0061619 A1 | 3/2003 | Giammaressi |
| 2003/0074565 A1 | 4/2003 | Wasilewski et al. |
| 2003/0077067 A1 | 4/2003 | Wu et al. |
| 2003/0088876 A1 | 5/2003 | Mao et al. |
| 2003/0093311 A1 | 5/2003 | Knowlson |
| 2003/0093784 A1 | 5/2003 | Dimitrova et al. |
| 2003/0093790 A1 | 5/2003 | Logan et al. |
| 2003/0093792 A1 | 5/2003 | Labeeb et al. |
| 2003/0095791 A1 | 5/2003 | Barton et al. |
| 2003/0101449 A1 | 5/2003 | Bentolila et al. |
| 2003/0101451 A1 | 5/2003 | Bentolila et al. |
| 2003/0101454 A1 | 5/2003 | Ozer et al. |
| 2003/0110499 A1 | 6/2003 | Knudson et al. |
| 2003/0110503 A1 | 6/2003 | Perkes |
| 2003/0115601 A1 | 6/2003 | Palazzo et al. |
| 2003/0115612 A1 | 6/2003 | Mao et al. |
| 2003/0118014 A1 | 6/2003 | Iyer et al. |
| 2003/0135513 A1 | 7/2003 | Quinn et al. |
| 2003/0135860 A1 | 7/2003 | Dureau |
| 2003/0139980 A1 | 7/2003 | Hamilton |
| 2003/0140351 A1 | 7/2003 | Hoarty et al. |
| 2003/0145323 A1 | 7/2003 | Hendricks et al. |
| 2003/0149975 A1 | 8/2003 | Eldering et al. |
| 2003/0149990 A1 | 8/2003 | Anttila et al. |
| 2003/0149993 A1 | 8/2003 | Son et al. |
| 2003/0161473 A1 | 8/2003 | Fransdonk |
| 2003/0172376 A1 | 9/2003 | Coffin |
| 2003/0179773 A1 | 9/2003 | Mocek et al. |
| 2003/0182261 A1 | 9/2003 | Patterson |
| 2003/0192060 A1* | 10/2003 | Levy ............... H04N 5/783 725/112 |
| 2003/0195927 A1 | 10/2003 | Virine et al. |
| 2003/0214962 A1 | 11/2003 | Allaye-Chan et al. |
| 2003/0217365 A1 | 11/2003 | Caputo |
| 2003/0229681 A1 | 12/2003 | Levitan |
| 2003/0237090 A1 | 12/2003 | Boston et al. |
| 2004/0006625 A1 | 1/2004 | Saha et al. |
| 2004/0013136 A1 | 1/2004 | Mailhot et al. |
| 2004/0031053 A1 | 2/2004 | Lim et al. |
| 2004/0034873 A1 | 2/2004 | Zenoni |
| 2004/0045030 A1 | 3/2004 | Reynolds et al. |
| 2004/0047599 A1 | 3/2004 | Grzeczkowski |
| 2004/0060076 A1 | 3/2004 | Song |
| 2004/0073915 A1 | 4/2004 | Dureau |
| 2004/0078809 A1 | 4/2004 | Drazin |
| 2004/0103437 A1 | 5/2004 | Allegrezza et al. |
| 2004/0109672 A1 | 6/2004 | Kim et al. |
| 2004/0117817 A1 | 6/2004 | Kwon et al. |
| 2004/0123313 A1 | 6/2004 | Koo et al. |
| 2004/0133467 A1 | 7/2004 | Siler |
| 2004/0133907 A1 | 7/2004 | Rodriguez et al. |
| 2004/0133909 A1* | 7/2004 | Ma ............... H04N 21/2668 348/E7.071 |
| 2004/0133917 A1 | 7/2004 | Schilling |
| 2004/0138909 A1 | 7/2004 | Mayer |
| 2004/0146006 A1 | 7/2004 | Jackson |
| 2004/0148625 A1 | 7/2004 | Eldering et al. |
| 2004/0163109 A1 | 8/2004 | Kang et al. |
| 2004/0163111 A1 | 8/2004 | Palazzo et al. |
| 2004/0177383 A1 | 9/2004 | Martinolich et al. |
| 2004/0179605 A1 | 9/2004 | Lane |
| 2004/0181800 A1 | 9/2004 | Rakib et al. |
| 2004/0181811 A1 | 9/2004 | Rakib |
| 2004/0186774 A1 | 9/2004 | Lee |
| 2004/0187150 A1 | 9/2004 | Gonder et al. |
| 2004/0187159 A1 | 9/2004 | Gaydos et al. |
| 2004/0193648 A1 | 9/2004 | Lai et al. |
| 2004/0193704 A1 | 9/2004 | Smith |
| 2004/0194134 A1 | 9/2004 | Gunatilake et al. |
| 2004/0199789 A1 | 10/2004 | Shaw et al. |
| 2004/0210936 A1 | 10/2004 | Rao et al. |
| 2004/0261114 A1 | 12/2004 | Addington et al. |
| 2004/0261116 A1 | 12/2004 | McKeown et al. |
| 2004/0267965 A1 | 12/2004 | Vasudevan et al. |
| 2005/0022237 A1 | 1/2005 | Nomura |
| 2005/0027696 A1 | 2/2005 | Swaminathan et al. |
| 2005/0028208 A1 | 2/2005 | Ellis et al. |
| 2005/0034171 A1 | 2/2005 | Benya |
| 2005/0034173 A1 | 2/2005 | Hatanaka |
| 2005/0039205 A1 | 2/2005 | Riedl |
| 2005/0039206 A1 | 2/2005 | Opdycke |
| 2005/0041679 A1 | 2/2005 | Weinstein et al. |
| 2005/0047596 A1 | 3/2005 | Suzuki |
| 2005/0050070 A1 | 3/2005 | Sheldon |
| 2005/0050160 A1 | 3/2005 | Upendran et al. |
| 2005/0055685 A1 | 3/2005 | Maynard et al. |
| 2005/0058115 A1 | 3/2005 | Levin et al. |
| 2005/0060742 A1 | 3/2005 | Riedl et al. |
| 2005/0060745 A1 | 3/2005 | Riedl et al. |
| 2005/0060758 A1 | 3/2005 | Park |
| 2005/0071669 A1 | 3/2005 | Medvinsky |
| 2005/0071882 A1 | 3/2005 | Rodriguez et al. |
| 2005/0086691 A1 | 4/2005 | Dudkiewicz et al. |
| 2005/0097598 A1 | 5/2005 | Pedlow, Jr. et al. |
| 2005/0105396 A1 | 5/2005 | Schybergson |
| 2005/0108529 A1 | 5/2005 | Juneau |
| 2005/0111844 A1 | 5/2005 | Compton et al. |
| 2005/0114141 A1 | 5/2005 | Grody |
| 2005/0114900 A1 | 5/2005 | Ladd et al. |
| 2005/0123001 A1 | 6/2005 | Craven et al. |
| 2005/0125528 A1 | 6/2005 | Burke et al. |
| 2005/0125832 A1 | 6/2005 | Jost et al. |
| 2005/0135476 A1 | 6/2005 | Gentric et al. |
| 2005/0144632 A1* | 6/2005 | Mears ............... H04H 60/33 725/15 |
| 2005/0144635 A1 | 6/2005 | Boortz et al. |
| 2005/0160470 A1 | 7/2005 | Strauss |
| 2005/0168323 A1 | 8/2005 | Lenoir et al. |
| 2005/0198686 A1 | 9/2005 | Krause et al. |
| 2005/0210502 A1 | 9/2005 | Flickinger et al. |
| 2005/0223409 A1 | 10/2005 | Rautila et al. |

(56) References Cited

U.S. PATENT DOCUMENTS

| | | |
|---|---|---|
| 2005/0229209 A1 | 10/2005 | Hildebolt et al. |
| 2005/0234998 A1 | 10/2005 | Lesandrini et al. |
| 2005/0235318 A1 | 10/2005 | Grauch et al. |
| 2005/0262542 A1 | 11/2005 | DeWeese et al. |
| 2005/0273819 A1 | 12/2005 | Knudson et al. |
| 2005/0276284 A1 | 12/2005 | Krause et al. |
| 2005/0289588 A1 | 12/2005 | Kinnear |
| 2005/0289618 A1 | 12/2005 | Hardin |
| 2005/0289619 A1 | 12/2005 | Melby |
| 2006/0010075 A1 | 1/2006 | Wolf |
| 2006/0019702 A1 | 1/2006 | Anttila et al. |
| 2006/0020984 A1 | 1/2006 | Ban et al. |
| 2006/0031883 A1 | 2/2006 | Ellis et al. |
| 2006/0036750 A1 | 2/2006 | Ladd et al. |
| 2006/0037060 A1 | 2/2006 | Simms et al. |
| 2006/0047957 A1 | 3/2006 | Helms et al. |
| 2006/0050784 A1 | 3/2006 | Lappalainen et al. |
| 2006/0059098 A1 | 3/2006 | Major et al. |
| 2006/0059342 A1 | 3/2006 | Medvinsky et al. |
| 2006/0062059 A1 | 3/2006 | Smith et al. |
| 2006/0064728 A1 | 3/2006 | Son et al. |
| 2006/0073843 A1 | 4/2006 | Aerrabotu et al. |
| 2006/0080408 A1 | 4/2006 | Istvan et al. |
| 2006/0084417 A1 | 4/2006 | Melpignano et al. |
| 2006/0085824 A1 | 4/2006 | Bruck et al. |
| 2006/0088063 A1 | 4/2006 | Hartung et al. |
| 2006/0130107 A1 | 6/2006 | Gonder et al. |
| 2006/0130113 A1 | 6/2006 | Carlucci et al. |
| 2006/0133398 A1 | 6/2006 | Choi et al. |
| 2006/0133644 A1 | 6/2006 | Wells et al. |
| 2006/0171390 A1 | 8/2006 | La |
| 2006/0171423 A1 | 8/2006 | Helms et al. |
| 2006/0190336 A1 | 8/2006 | Pisaris-Henderson et al. |
| 2006/0197828 A1 | 9/2006 | Zeng et al. |
| 2006/0218576 A1* | 9/2006 | Johnson ............ H04N 21/26603 348/E7.054 |
| 2006/0218601 A1 | 9/2006 | Michel |
| 2006/0218604 A1 | 9/2006 | Riedl et al. |
| 2006/0236353 A1 | 10/2006 | Cheng et al. |
| 2006/0248553 A1 | 11/2006 | Mikkelson et al. |
| 2006/0248555 A1 | 11/2006 | Eldering |
| 2006/0253328 A1 | 11/2006 | Kohli et al. |
| 2006/0253584 A1 | 11/2006 | Dixon et al. |
| 2006/0253864 A1 | 11/2006 | Easty |
| 2006/0256376 A1 | 11/2006 | Hirooka |
| 2006/0259924 A1 | 11/2006 | Boortz et al. |
| 2006/0271946 A1 | 11/2006 | Woundy et al. |
| 2006/0277569 A1 | 12/2006 | Smith |
| 2006/0288374 A1 | 12/2006 | Ferris et al. |
| 2006/0291506 A1 | 12/2006 | Cain |
| 2006/0294259 A1 | 12/2006 | Matefi et al. |
| 2007/0022459 A1 | 1/2007 | Gaebel et al. |
| 2007/0028260 A1 | 2/2007 | Williams et al. |
| 2007/0029379 A1 | 2/2007 | Peyer |
| 2007/0033531 A1 | 2/2007 | Marsh |
| 2007/0047449 A1 | 3/2007 | Berger et al. |
| 2007/0053293 A1 | 3/2007 | McDonald et al. |
| 2007/0055985 A1 | 3/2007 | Schiller et al. |
| 2007/0061818 A1 | 3/2007 | Williams et al. |
| 2007/0074258 A1 | 3/2007 | Wood et al. |
| 2007/0076728 A1 | 4/2007 | Rieger et al. |
| 2007/0089127 A1 | 4/2007 | Flickinger et al. |
| 2007/0094691 A1 | 4/2007 | Gazdzinski |
| 2007/0094692 A1 | 4/2007 | De |
| 2007/0101157 A1 | 5/2007 | Faria |
| 2007/0101370 A1 | 5/2007 | Calderwood |
| 2007/0113243 A1 | 5/2007 | Brey |
| 2007/0115389 A1 | 5/2007 | McCarthy et al. |
| 2007/0118852 A1 | 5/2007 | Calderwood |
| 2007/0121569 A1 | 5/2007 | Fukui et al. |
| 2007/0121678 A1 | 5/2007 | Brooks et al. |
| 2007/0124781 A1 | 5/2007 | Casey et al. |
| 2007/0130581 A1 | 6/2007 | Del et al. |
| 2007/0150919 A1 | 6/2007 | Morishita et al. |
| 2007/0153820 A1 | 7/2007 | Gould |
| 2007/0156539 A1 | 7/2007 | Yates |
| 2007/0157234 A1 | 7/2007 | Walker |
| 2007/0157242 A1 | 7/2007 | Cordray et al. |
| 2007/0162927 A1 | 7/2007 | Ramaswamy et al. |
| 2007/0192794 A1 | 8/2007 | Curtis et al. |
| 2007/0204300 A1 | 8/2007 | Markley et al. |
| 2007/0204310 A1 | 8/2007 | Hua et al. |
| 2007/0204311 A1 | 8/2007 | Hasek et al. |
| 2007/0204314 A1 | 8/2007 | Hasek et al. |
| 2007/0217436 A1 | 9/2007 | Markley et al. |
| 2007/0233857 A1 | 10/2007 | Cheng et al. |
| 2007/0241176 A1 | 10/2007 | Epstein et al. |
| 2007/0244760 A1 | 10/2007 | Bodnar et al. |
| 2007/0250872 A1 | 10/2007 | Dua |
| 2007/0250880 A1 | 10/2007 | Hainline |
| 2007/0263653 A1 | 11/2007 | Hassan et al. |
| 2007/0271386 A1 | 11/2007 | Kurihara et al. |
| 2007/0274400 A1 | 11/2007 | Murai et al. |
| 2007/0274537 A1 | 11/2007 | Srinivasan |
| 2007/0276925 A1 | 11/2007 | La et al. |
| 2007/0276926 A1 | 11/2007 | LaJoie et al. |
| 2008/0016526 A1 | 1/2008 | Asmussen |
| 2008/0022012 A1 | 1/2008 | Wang |
| 2008/0052157 A1 | 2/2008 | Kadambi et al. |
| 2008/0066112 A1 | 3/2008 | Bailey et al. |
| 2008/0092181 A1 | 4/2008 | Britt |
| 2008/0098212 A1 | 4/2008 | Helms et al. |
| 2008/0098446 A1 | 4/2008 | Seckin et al. |
| 2008/0101460 A1 | 5/2008 | Rodriguez |
| 2008/0103903 A1 | 5/2008 | Flake et al. |
| 2008/0109823 A1 | 5/2008 | Whitfield et al. |
| 2008/0109857 A1 | 5/2008 | Goodwill et al. |
| 2008/0115166 A1 | 5/2008 | Bhogal et al. |
| 2008/0115169 A1 | 5/2008 | Ellis et al. |
| 2008/0124056 A1 | 5/2008 | Concotelli et al. |
| 2008/0134156 A1 | 6/2008 | Osminer et al. |
| 2008/0134165 A1 | 6/2008 | Anderson et al. |
| 2008/0141317 A1 | 6/2008 | Radloff et al. |
| 2008/0147497 A1 | 6/2008 | Tischer |
| 2008/0152116 A1 | 6/2008 | Sylvain |
| 2008/0152316 A1 | 6/2008 | Sylvain |
| 2008/0155059 A1 | 6/2008 | Hardin et al. |
| 2008/0155588 A1 | 6/2008 | Roberts et al. |
| 2008/0163305 A1 | 7/2008 | Johnson et al. |
| 2008/0177998 A1 | 7/2008 | Apsangi et al. |
| 2008/0192820 A1 | 8/2008 | Brooks et al. |
| 2008/0201748 A1 | 8/2008 | Hasek et al. |
| 2008/0216107 A1* | 9/2008 | Downey ............... H04N 21/812 725/25 |
| 2008/0229354 A1 | 9/2008 | Morris et al. |
| 2008/0235746 A1 | 9/2008 | Peters et al. |
| 2008/0244667 A1 | 10/2008 | Osborne |
| 2008/0263578 A1 | 10/2008 | Bayer et al. |
| 2008/0271068 A1 | 10/2008 | Ou et al. |
| 2008/0273591 A1 | 11/2008 | Brooks et al. |
| 2008/0313671 A1 | 12/2008 | Batrouny et al. |
| 2008/0313691 A1 | 12/2008 | Cholas et al. |
| 2009/0025027 A1 | 1/2009 | Craner |
| 2009/0028182 A1 | 1/2009 | Brooks et al. |
| 2009/0030802 A1 | 1/2009 | Plotnick et al. |
| 2009/0088143 A1* | 4/2009 | Kim .................... G06F 3/0488 455/418 |
| 2009/0132346 A1 | 5/2009 | Duggal et al. |
| 2009/0187939 A1 | 7/2009 | Lajoie |
| 2009/0210899 A1 | 8/2009 | Lawrence-Apfelbaum et al. |
| 2009/0210912 A1 | 8/2009 | Cholas et al. |
| 2009/0216761 A1 | 8/2009 | Raichelgauz et al. |
| 2009/0222854 A1* | 9/2009 | Cansler .............. H04N 21/2387 725/35 |
| 2009/0254971 A1 | 10/2009 | Herz et al. |
| 2009/0319379 A1 | 12/2009 | Joao |
| 2009/0320059 A1 | 12/2009 | Bolyukh |
| 2010/0057560 A1 | 3/2010 | Skudlark et al. |
| 2010/0058406 A1 | 3/2010 | Xu et al. |
| 2010/0157928 A1 | 6/2010 | Spinar et al. |
| 2010/0161492 A1 | 6/2010 | Harvey et al. |
| 2010/0175084 A1 | 7/2010 | Ellis et al. |
| 2010/0186032 A1* | 7/2010 | Pradeep ............ H04N 21/44016 725/38 |

(56) References Cited

U.S. PATENT DOCUMENTS

| | | |
|---|---|---|
| 2010/0223491 A1 | 9/2010 | Ladd et al. |
| 2010/0251304 A1 | 9/2010 | Donoghue et al. |
| 2010/0251305 A1 | 9/2010 | Kimble et al. |
| 2010/0262488 A1 | 10/2010 | Harrison et al. |
| 2010/0269131 A1 | 10/2010 | Newberry et al. |
| 2010/0313225 A1 | 12/2010 | Cholas et al. |
| 2011/0015989 A1 | 1/2011 | Tidwell et al. |
| 2011/0016479 A1 | 1/2011 | Tidwell et al. |
| 2011/0016482 A1 | 1/2011 | Tidwell et al. |
| 2011/0093900 A1 | 4/2011 | Patel et al. |
| 2011/0103374 A1 | 5/2011 | Lajoie et al. |
| 2011/0107364 A1 | 5/2011 | Lajoie et al. |
| 2011/0107379 A1 | 5/2011 | Lajoie et al. |
| 2011/0119703 A1 | 5/2011 | Schlack et al. |
| 2011/0178880 A1 | 7/2011 | Karaoguz et al. |
| 2011/0197224 A1 | 8/2011 | Meijer |
| 2011/0231265 A1 | 9/2011 | Brown et al. |
| 2011/0307339 A1 | 12/2011 | Russell et al. |
| 2011/0317977 A1 | 12/2011 | Harris |
| 2012/0011269 A1* | 1/2012 | Krikorian ............ H04N 19/102 709/231 |
| 2012/0023522 A1 | 1/2012 | Anderson et al. |
| 2012/0042331 A1 | 2/2012 | Wolf, Sr. |
| 2012/0084813 A1 | 4/2012 | Dmitriev et al. |
| 2012/0110620 A1 | 5/2012 | Kilar et al. |
| 2012/0159539 A1 | 6/2012 | Berberet et al. |
| 2012/0224834 A1 | 9/2012 | Chen et al. |
| 2012/0253939 A1* | 10/2012 | Grigoriev .......... G06Q 30/0251 705/14.49 |
| 2012/0278841 A1 | 11/2012 | Hasek et al. |
| 2012/0310762 A1 | 12/2012 | Robbin et al. |
| 2013/0036007 A1* | 2/2013 | Lau ........................ G06Q 30/02 705/14.49 |
| 2013/0133009 A1 | 5/2013 | Bhogal et al. |
| 2013/0211879 A1* | 8/2013 | Holland .............. G06Q 30/0241 705/14.55 |
| 2013/0227608 A1 | 8/2013 | Evans et al. |
| 2013/0290556 A1 | 10/2013 | Giladi |
| 2013/0295876 A1* | 11/2013 | Sargin ....................... G09B 7/06 455/405 |
| 2013/0325870 A1 | 12/2013 | Rouse et al. |
| 2013/0330063 A1 | 12/2013 | Bonovich et al. |
| 2014/0020017 A1 | 1/2014 | Stern et al. |
| 2014/0129352 A1 | 5/2014 | Ringdahl |
| 2014/0157313 A1 | 6/2014 | Shartzer et al. |
| 2014/0164760 A1 | 6/2014 | Hybertson et al. |
| 2014/0208349 A1 | 7/2014 | Nair et al. |
| 2014/0282777 A1 | 9/2014 | Gonder et al. |
| 2016/0127440 A1 | 5/2016 | Gordon |
| 2016/0366465 A1* | 12/2016 | Kerns .................. H04N 21/812 |
| 2017/0164378 A1 | 6/2017 | Gunasekara et al. |
| 2017/0164416 A1 | 6/2017 | Yeddala et al. |
| 2018/0014041 A1 | 1/2018 | Chen et al. |

FOREIGN PATENT DOCUMENTS

| | | | |
|---|---|---|---|
| WO | WO-0191474 A2 | 11/2001 | |
| WO | WO-2004008693 A1 | 1/2004 | |
| WO | WO-2007136399 A1 | 11/2007 | |
| WO | WO-2008016786 A1 | 2/2008 | |
| WO | WO-2009149501 A1 * | 12/2009 | ....... G06F 17/30241 |

OTHER PUBLICATIONS

Deering, S., et al., "Internet Protocol, Version 6 (IPv6) Specification," Internet Engineering Task Force (IETF) RFC 2460, Dec. 1998, 39 pages.
"DOCSIS 3.0 Management Features Differences Technical Report" CM-TR-MGMT V3.0-DIFF-V01-071228, 2007, 62 pages.
"DOCSIS 3.0 OSSI Configuration Management Technical Report" CM-TR-OSSIv3.0-CM-V01-080926, 2008, 84 pages.
Griffith D.W., et al., "Resource Planning and Bandwidth Allocation in Hybrid Fiber-Coax Residential Networks," National Institute of Standards and Technology (NIST), Oct. 1, 2005, 10 pages.
"Internet Protocol, DARPA Internet Program, Protocol Specification", IETF RCF 791, Sep. 1981, 50 pages.
Kanouff, Communications Technology: Next-Generation Bandwidth Management—The Evolution of the Anything-to-Anywhere Network, 8 pages, Apr. 1, 2004.
Motorola DOCSIS Cable Module DCM 2000 specifications, 4 pages, copyright 2001, 4 pages.
Open Cable Specification entitled "Enhanced TV Binary Interchange Format 1 0" 0C-SP-ETV-131F1.0-106-110128 dated Jan. 28, 2011, 408 pages.
OpenVision Session Resource Manager—Open Standards-Based Solution Optimizes Network Resources by Dynamically Assigning Bandwidth in the Delivery of Digital Services article, 2 pages, (copyright 2006), ( http://www.imake.com/hopenvision ).
OpenVision Session Resource Manager features and information, 2 pages, ( http://www.imake.com/hopenvision ).
Tandberg Television specification entitled "AdPoint.RTM. Advanced Advertising Platform" dated Mar. 2008, 2 pages.

* cited by examiner

APPARATUS AND METHODS FOR SELECTIVE ENFORCEMENT OF SECONDARY CONTENT VIEWING

PRIORITY AND RELATED APPLICATIONS

This application is a divisional of and claims priority to co-owned U.S. patent application Ser. No. 16/933,701 filed Jul. 20, 2020 and entitled "APPARATUS AND METHODS FOR SELECTIVE ENFORCEMENT OF DIGITAL CONTENT VIEWING", issuing as U.S. Pat. No. 11,496,022 on Nov. 8, 2022, which is a divisional of and claims priority to co-owned U.S. patent application Ser. No. 15/853,468 filed Dec. 22, 2017 of the same title, issued as U.S. Pat. No. 10,721,504 on Jul. 21, 2020, which is a divisional of and claims priority to co-owned U.S. patent application Ser. No. 13/676,012 filed Nov. 13, 2012 of the same title, and issued as U.S. Pat. No. 9,854,280 on Dec. 26, 2017, which claims priority to commonly owned U.S. Provisional Patent Application Ser. No. 61/670,082 of the same title filed on Jul. 10, 2012, each of the foregoing which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1 Technology Field

The disclosure relates generally to the field of data and content distribution and delivery via a content distribution or other network. In one exemplary aspect, the disclosure relates to the selective delivery of supplemental or secondary content such as advertising or promotions.

2. Description of Related Technology

"Nielsen Ratings" are a well-known system of evaluating the viewing habits of cross sections of the population. When collecting Nielsen ratings, companies use statistical techniques to develop a sample population which is a cross section of a larger national population. Theoretically, the viewing habits of the sample population will mirror the larger population. The company then measures the viewing habits of the population to identify, among other things, what programs the population is watching as well as the time and frequency at which those programs are watched. This information is then extrapolated to gain insight on the viewing habits of the larger population. Historically, the Nielsen system has been the primary source of audience measurement information in the television industry. The Nielsen system, therefore, affects various aspects of television including inter alia, advertising rates, schedules, viability of particular shows, etc., and has been also recently expanded from measuring an audience of program content to measuring an audience of advertising (i.e., Nielsen ratings may be provided for advertisements themselves).

The Nielsen system collects data regarding audiences either (i) by asking viewers of various demographics to keep a written record of the television shows they watch throughout the day and evening, or (ii) by using "meters," which are small devices connected to televisions in selected homes or which listen for an audio tone (aka "watermark") which electronically gathers the viewing habits of the home and transmits the information nightly to Nielsen or a proxy entity over a phone line or other connection. See the discussion regarding the NAVE (Nielsen Audio Video Encoding) system provided infra.

For media content providers such as cable and satellite companies and the like, a major issue is how to more accurately target population segments for advertising campaigns based on particular characteristics of an audience, opportunities for insertion (or replacement) of an advertisement, and other factors. It is most desirable for advertisers to have advertisements for products or services that are targeted to a particular demographic to be viewed by that demographic; such targeting can be accomplished at least in part based on data such as that provided by the aforementioned Nielsen system.

However, the foregoing needs and desires of the service providers and advertisers must be balanced against those of their customers (subscribers), in that it is ultimately subscriber satisfaction which keeps a given individual or household or business using that service provider. One facet of this subscriber satisfaction relates to not unnecessarily inundating the subscriber with advertisements or promotions. Subscriber frustration can readily result from, e.g.: (i) repetition of the same advertisement or promotion over and over, especially within a comparatively short period; (ii) advertisements or promotions which are unduly long (whether taken individually, or in combination with other advertisements or promotions), so as to keep a user away from the primary programming content (e.g., television show, movie, game, etc.); and/or (iii) advertising or promotional content which is not applicable or even inappropriate for viewing by a given user at, e.g., a specific time, or in general.

Aside from the foregoing "frustration" aspect, many television viewers today simply pay less attention to video commercials in broadcast channels, as they can merely change channels and switch to other programming on other channels during commercial breaks; the wider choice of programming currently offered by service providers gives the user more options to watch alternate content during advertisements. Users may also skip the commercials when a consumer watches a program previously recorded, such as on a DVR. Users may also simply walk away from the television and/or engage in some other activity. The proliferation of mobile computing devices such as laptops, smartphones, and tablets in consumer households has only exacerbated this problem, as such devices tend to draw consumers' attention away from the television during the commercial.

Hence, broadcast video commercials could become less engaging for the television audience over time, and less effective in getting the advertiser's message across to the viewers (and emphasizing their brand and products).

Network Content Storage

Network-based content recording and storage (such as e.g., the exemplary "Start Over" and "Look Back" network DVR services offered by the Assignee hereof) allow users of a network to obtain what would otherwise be "live" content (e.g., linear television broadcasts or the like) at some time subsequent to their actual airing, thereby enabling a user to view programming which otherwise would be missed. These systems typically receive instructions from the user as to which programming they want to view, and the network "cloud" streams the requested content to that user. Variants of these types of systems either receive prior instructions from a user before the broadcast of the live event (e.g., "record program XYZ airing on channel 123 at 8 pm on 1/1/12"), or alternatively store various content based on some other criteria (e.g., popularity), and then allow the user a period of time to watch it.

Such "network DVR" systems typically will disable trick mode functionality (i.e., fast forward), which would otherwise allow a viewer of the cloud-recorded content to skip over an advertisement or promotion. This is often a quid pro quo for the user having the ability to recapture via the network content that they otherwise would have missed; i.e., "you can watch the (live) program you want, but you'll have to watch the advertisements also." Regardless of the motivation, such "must watch" features are often a source of annoyance or aggravation to viewers, and hence may significantly reduce subscriber satisfaction with the network DVR service (or the service provider, programmer, and advertiser individually or collectively).

Hence, there is a need for improved methods and apparatus which effectively balance the service provider's and advertiser's needs relating to secondary content exposure and penetration (and hence ultimately revenue derived therefrom), and the desire of many subscribers to avoid such secondary content whenever possible (or at least that which is either overly repetitive, too long, or inapplicable/inappropriate for their viewing needs).

These methods and apparatus would also ideally be provided using substantially extant network infrastructure and components, and would be compatible with a number of different client device and delivery systems including both wired and wireless technologies.

SUMMARY

The foregoing needs are addressed herein by providing, inter alia, methods and apparatus adapted to selectively enforce viewing of advertising or promotional content to be delivered over a network to one or more network devices and associated users.

In a first aspect, a method of operating a content distribution network is disclosed. In one embodiment, the method includes selectively enabling one or more functional aspects of a user premises device based at least in part on a user's prior activity relating to secondary content.

In a second aspect, a content management apparatus for use within a content distribution network is disclosed.

In a third aspect, computer readable apparatus comprising media adapted to contain a computer program is disclosed. In one embodiment, the program has a plurality of instructions, which, when executed, selectively enable one or more functions of an associated media rendering device.

In a fourth aspect, a method of doing business in a content distribution network is disclosed. In one embodiment, the method includes crediting advertisers for advertising impressions that are missed by a user fast-forwarding or skipping over ads.

In a fifth aspect, CPE adapted to collect data useful in advertising or promotion delivery is disclosed. In one embodiment, the CPE comprises a cable or satellite digital set-top box having client software running thereon, the client software being configured to collect requisite data so as to selectively enforce advertising viewing. The data may also be transmitted to a network (e.g., headend) system via e.g., upstream/OOB ("out of band") communications.

In a sixth aspect, a mobile wireless device is disclosed. In one embodiment, the device is a smartphone or tablet computer, and includes an application (e.g., "app") running thereon which is configured to enforce one or more network operator or advertiser policies regarding secondary content.

In a seventh aspect, a method of managing user interaction with one or more advertisements is disclosed. In one embodiment, the method includes providing the user with a dynamic menu structure when encountering advertisements within a program stream (e.g., during fast forwarding in a network-based DVR context). The menu provides the user with options for interacting or dispensing of the advertisement, such as, e.g., skipping, saving for later, watching, etc.

In an eighth aspect, an apparatus configured to provide interactive functionality to a user thereof is disclosed. In one embodiment, the apparatus includes a processor and a storage device in data communication with the processor. The storage device comprises at least one computer program executable on the processor, the at least one computer program configured to, when executed: during trick mode operation, evaluate content being rendered for the user to identify at least one instance of secondary content. For the identified at least one instance, the program is configured to provide the user with the ability to select from a plurality of options for treatment of the secondary content; receive a user selection of at least one of the plurality of options; and implement the received user selection.

In a ninth aspect, premises apparatus configured to provide selective secondary content enforcement for a user thereof is disclosed. In one embodiment, the apparatus includes: a processor; a mass storage device in data communication with the processor; and a storage device in data communication with the processor, the storage device comprising at least one computer program executable on the processor. In one variant, the at least one computer program is configured to, when executed: evaluate content being rendered for the user and stored on the mass storage device to identify at least one instance of secondary content; for the identified at least one instance, determine a policy to apply to the rendering of the secondary content; and apply the determined policy to the rendering of the secondary content.

In a tenth aspect, a method of providing content to a user of a mobile device is disclosed. In one embodiment, the method includes: providing content to a recording device in communication with the mobile device, the content comprising primary and secondary content; recording the primary and secondary content on the recording device; streaming the recorded content to the mobile device from the recording device; and selectively enabling or disabling one or more secondary content control functions at the mobile device based at least in part on a criterion related to the user's interaction with the secondary content.

Other features and advantages of the present disclosure will immediately be recognized by persons of ordinary skill in the art with reference to the attached drawings and detailed description of exemplary embodiments as given below.

Figure 1:
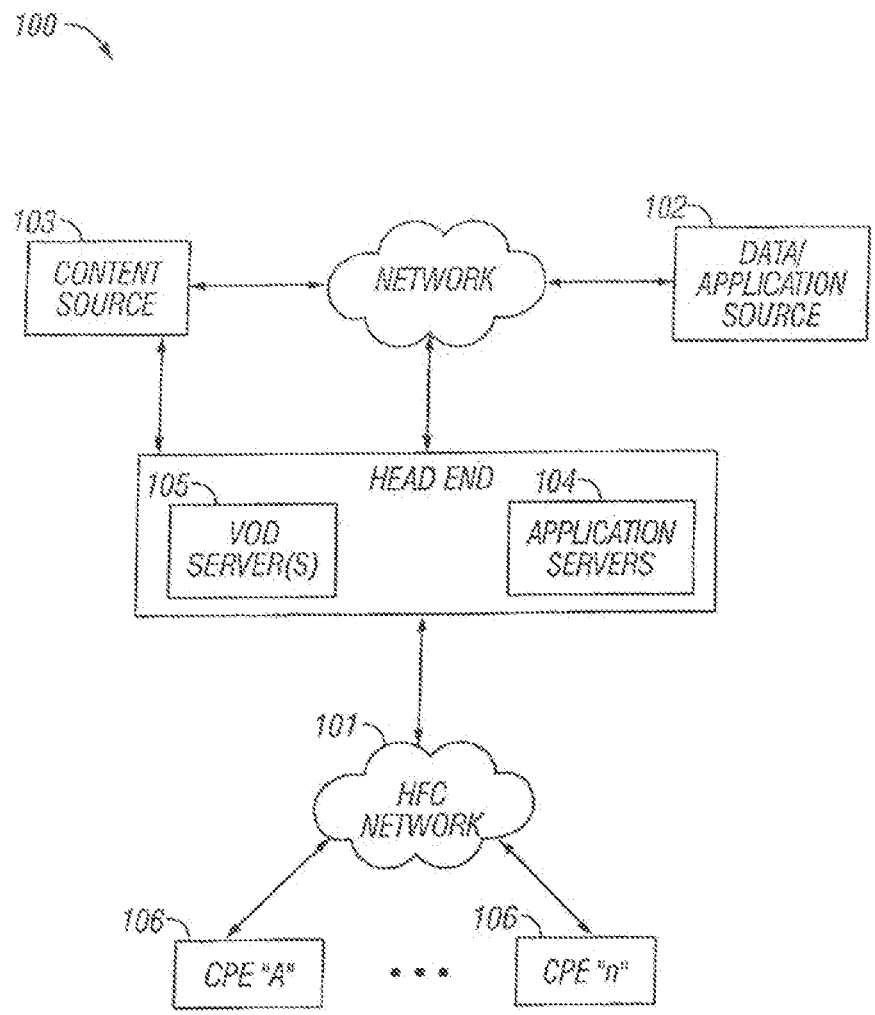
FIG. 1 is a functional block diagram illustrating an exemplary HFC cable network configuration useful with the present disclosure.

All Figures © Copyright 2012 Time Warner Cable, Inc. All rights reserved.

DETAILED DESCRIPTION

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, and smartphones.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the term "consideration" refers without limitation to any payment, compensation, bargain, barter, release, option, or other arrangement wherein something of actual, perceived or potential future value (whether by an objective or subjective standard) is given, assigned, transferred or exchanged. For example, one form of consideration is a monetary payment. Another comprises an exchange of services. Yet another comprises release from an obligation or debt. Still another form comprises a subscription or installment plan. Yet a further form comprises providing a limited time option. Myriad other forms of consideration will be appreciated by those of ordinary skill given the present disclosure.

The terms "Consumer Premises Equipment (CPE)" and "host device" refer without limitation to any type of electronic equipment located within a consumer's or user's premises and connected to a network. The term "host device" includes terminal devices that have access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "database" refers generally to one or more tangible or virtual data storage locations, which may or may not be physically co-located with each other or other system components.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multifunction system.

As used herein, the terms "service", "content", and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "DOCSIS" refers to any of the existing or planned variants of the Data Over Cable Services Interface Specification, including for example DOCSIS versions 1.0, 1.1, 2.0 and 3.0.

As used herein, the term gateway includes, without limitation, devices configured to interface with a network, and pass signals to or exchange signals with, another device in communication therewith. Various exemplary gateways are described in, inter alia, co-owned U.S. patent application Ser. No. 11/818,236 filed on Jun. 13, 2007, entitled "PREMISES GATEWAY APPARATUS AND METHODS FOR USE IN A CONTENT-BASED NETWORK", and issued as U.S. Pat. No. 7,594,131 on Dec. 18, 2008; U.S. patent application Ser. No. 12/582,619 filed on Oct. 20, 2009 and entitled "GATEWAY APPARATUS AND METHODS FOR DIGITAL CONTENT DELIVERY IN A NETWORK", and issued as U.S. Pat. No. 9,027,062 on May 5, 2015; and U.S. patent application Ser. No. 12/480,597 filed on Jun. 8, 2009, entitled "MEDIA BRIDGE APPARATUS AND METHODS", and issued as U.S. Pat. No. 9,602,864 on Mar. 21, 2017, each of the foregoing being incorporated herein by reference in its entirety.

As used herein, the term "headend" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer without limitation to a cable, fiber to the home (FTTH), fiber to the curb (FTTC), satellite, Hybrid Fiber Copper (HFCu), or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, HFCu networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols.

As used herein, the term "interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.) or IrDA families.

As used herein, the term "node" refers to any functional entity associated with a network, such as for example an OLT or ONU, whether physically discrete or distributed across multiple locations.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer system or network.

As used herein, the term "service," "content," "program" and "stream" are sometimes used synonymously to refer to a sequence of packetized data that is provided in what a subscriber may perceive as a service. A "service" (or "content," or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "service group" refers without limitation to either a group of service users (e.g., subscribers), or the resources shared by them in the form of, for example, entire cable RF signal, only the RF channels used to receive the service or otherwise treated as a single logical unit by the network for resource assignment.

As used herein, the term "user interface" refers to, without limitation, any visual, graphical, tactile, audible, sensory, or other means of providing information to and/or receiving information from a user or other entity.

As used herein, the term "Wi-Fi" refers to, without limitation, any of the variants of IEEE-Std. 802.11 or related standards including 802.11 a/b/g/n/s/v or 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, and infrared (i.e., IrDA).

Overview

In one salient aspect, the present disclosure discloses methods and apparatus for selectively enforcing one or more rules regarding secondary content insertion and user interaction therewith. In one embodiment, the user accessing "cloud" stored primary content such as a previously aired television program or movie is selectively given use of fast-forward (FF) or other functions with respect to secondary content (e.g., advertisements or promotions), such that the user can decide whether they wish to watch the secondary content, or rather fast-forward through, skip it, or save it for later (e.g., in "cloud" storage).

Subscriber viewing is determined in one variant using information contained in the program stream(s), such as, e.g., Nielsen Audio Video Encoder (NAVE) audio watermark data. The appropriate network entity, or a user's CPE in other variants, retains data relating to which advertisements have been viewed, and this information is used to selectively permit the user of the CPE to FF or skip the secondary content. This data can also be further used by a network entity (e.g., server) for demographic or advertisement targeting analysis or the like.

Subscriber privacy and anonymity is also optionally maintained in one embodiment via, e.g., hashing or encrypting data relating to the CPE and/or subscriber, thus ensuring that any data sent to the network is not traceable to a specific user account.

In another embodiment, users encountering an advertisement while traversing a program stream (e.g., while fast-forwarding) are presented with one or more choices regarding viewing and/or interaction with the advertisement, such as via an on-screen menu.

In yet another alternative, when a user selects to fast-forward an advertisement, the frame rate and/or speed of the playback of the advertisement is adjusted, and the audio content is provided to the user, thereby still creating an "impression" of the advertisement.

In yet another embodiment, users traversing content recorded on premises devices such as DVRs or even mobile devices are provided the foregoing skipping and/or menu functionality.

Exemplary network and client apparatus for implementing the various facets of the disclosure are also described, as are business methodologies and an operation business "rules" engine (e.g., computer program).

Detailed Description of Exemplary Embodiments

Exemplary embodiments of the secondary content selective enforcement apparatus and methods of the present disclosure are now described in detail. While these exemplary embodiments are described in the context of a hybrid fiber coax (HFC) cable architecture having a multiple systems operator (MSO), digital networking capability, and plurality of client devices/CPE, the general principles and advantages of the disclosure may be extended to other types of networks and architectures, whether broadband, narrowband, wired or wireless, content or data, or otherwise. Hence, the following description is merely exemplary in nature. For example, the disclosure may be practiced over a fiber-to-the-home (FTTH) or fiber-to-the-curb (FTTC) system, or over satellite or millimeter wave-based networks having two-way capabilities similar to today's digital cable HFC networks.

It will also be appreciated that while described generally in the context of a network providing service to a customer or consumer (i.e., residential) end user domain, the present disclosure may be readily adapted to other types of environments including, e.g., commercial/enterprise, and government/military applications. Myriad other applications are possible.

Also, while certain aspects are described primarily in the context of the well known IP or Internet Protocol (described in, inter alia, RFC 791 and 2460), it will be appreciated that the present disclosure may utilize other types of protocols (and in fact bearer networks to include other internets and intranets) to implement the described functionality.

Bearer Network Architecture

FIG. 1 illustrates a typical content distribution network configuration with which the apparatus and methods of the present disclosure may be used. The various components of the network 100 include (i) one or more data and application origination points 102; (ii) one or more content sources 103, (iii) one or more application distribution servers 104; (iv) one or more VoD servers 105, and (v) consumer premises equipment (CPE) 106. The distribution server(s) 104, VoD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VoD servers, and/or CPE devices (as well as different network topologies) may be utilized consistent with the disclosure. For example, the headend architecture of FIG. 1a (described in greater detail below) may be used.

The data/application origination point 102 comprises any medium that allows data and/or applications (such as a VoD-based application, gaming application, or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VoD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the servers 104, 105) that can be accessed by a distribution server 104 or VOD server 105.

Figure 1A:
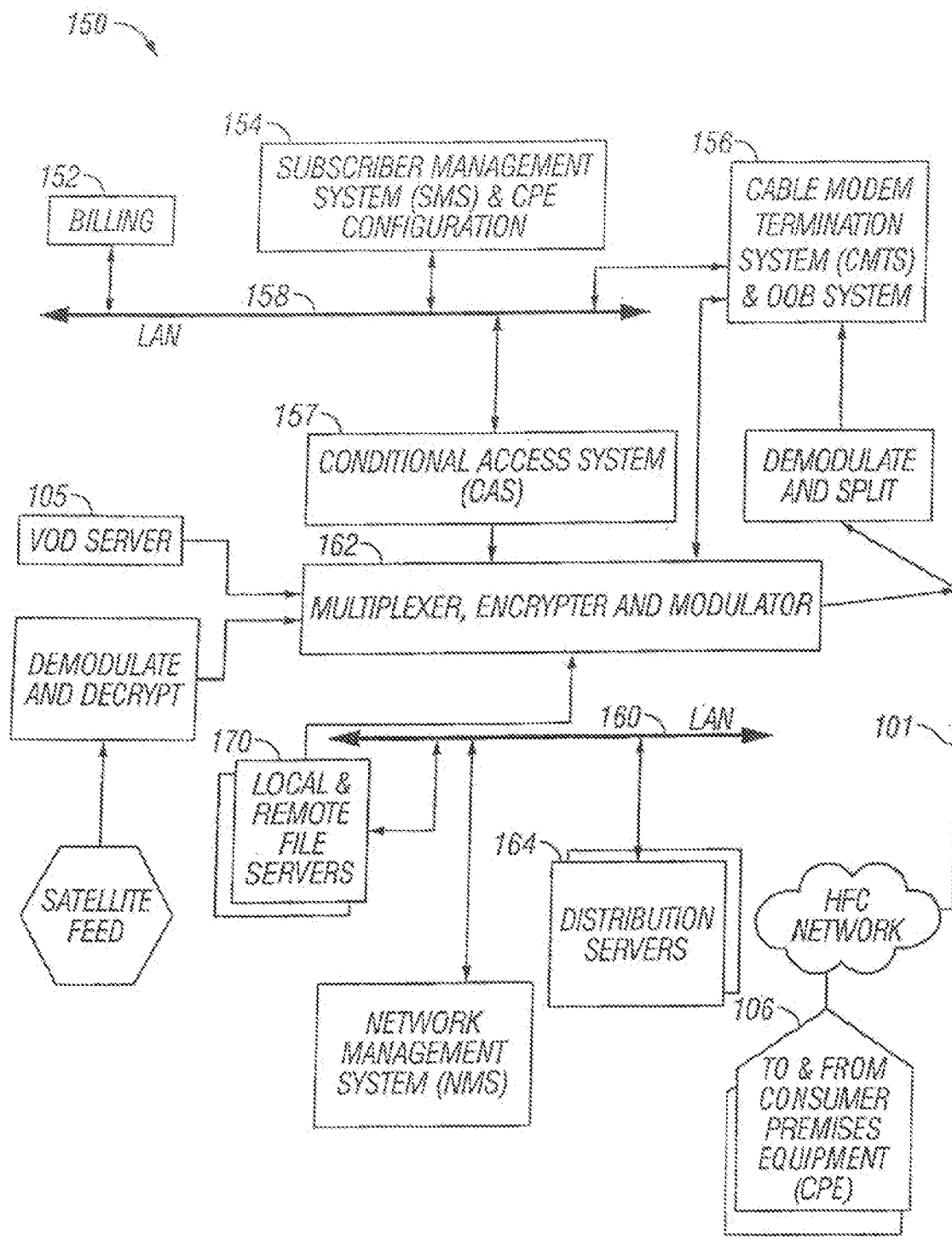
FIG. 1a is a functional block diagram illustrating one exemplary HFC cable network headend configuration useful with the present disclosure.

Referring now to FIG. 1a, one exemplary embodiment of headend architecture useful with the present disclosure is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the disclosure. It will also be appreciated that the headend configuration depicted in FIG. 1a is high-level, conceptual architecture and that each MSO may have multiple headends deployed using custom architectures.

The architecture 150 of FIG. 1a further includes a multiplexer/encrypter/modulator (MEM) 162 coupled to the HFC network 101 adapted to "condition" content for transmission over the network. The distribution servers 164 are coupled to the LAN 160, which provides access to the MEM 162 and network 101 via one or more file servers 170. The VoD servers 105 are coupled to the LAN 160 as well, although other architectures may be employed (such as for example where the VoD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend and sent to neighborhood hubs (FIG. 1b) via a variety of interposed network components.

Content (e.g., audio, video, data, applications, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the disclosure is in no way limited to these approaches.

Figure 1B:
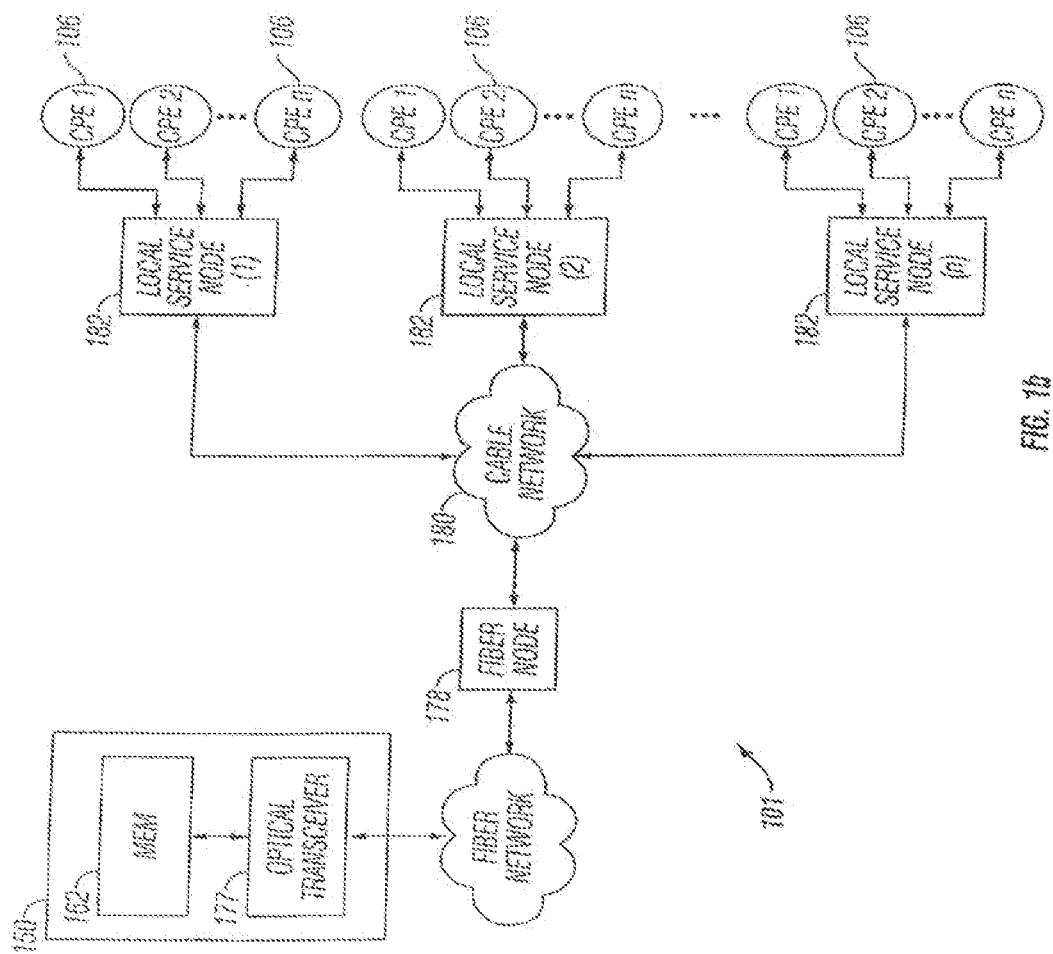
FIG. 1b is a functional block diagram illustrating one exemplary local service node configuration useful with the present disclosure.

As shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the headend or further downstream). The optical domain signals are then distributed to a fiber node 178, which further distributes the signals over a distribution network 180 to a plurality of local servicing nodes 182. This provides an effective 1:N expansion of the network at the local service end.

"Switched" Networks

Figure 1C:
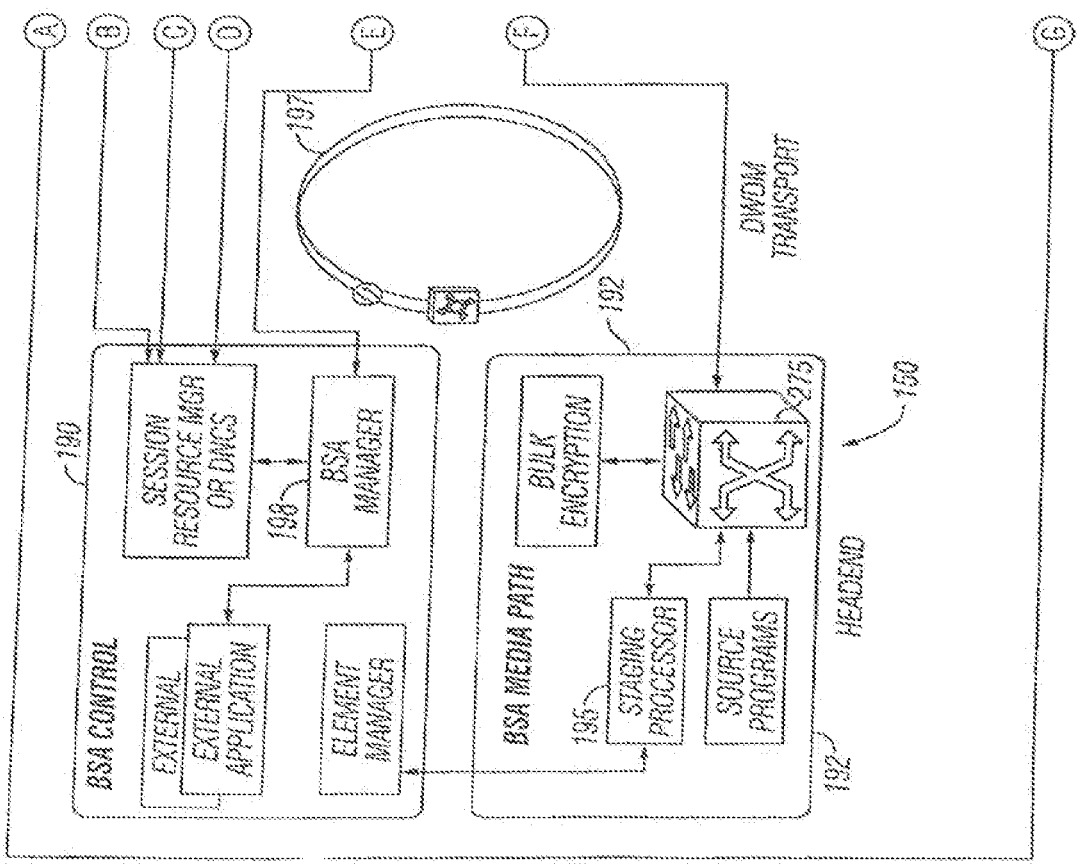
FIG. 1c is a functional block diagram illustrating one exemplary broadcast switched architecture (BSA) network useful with the present disclosure.
Figure 1C:
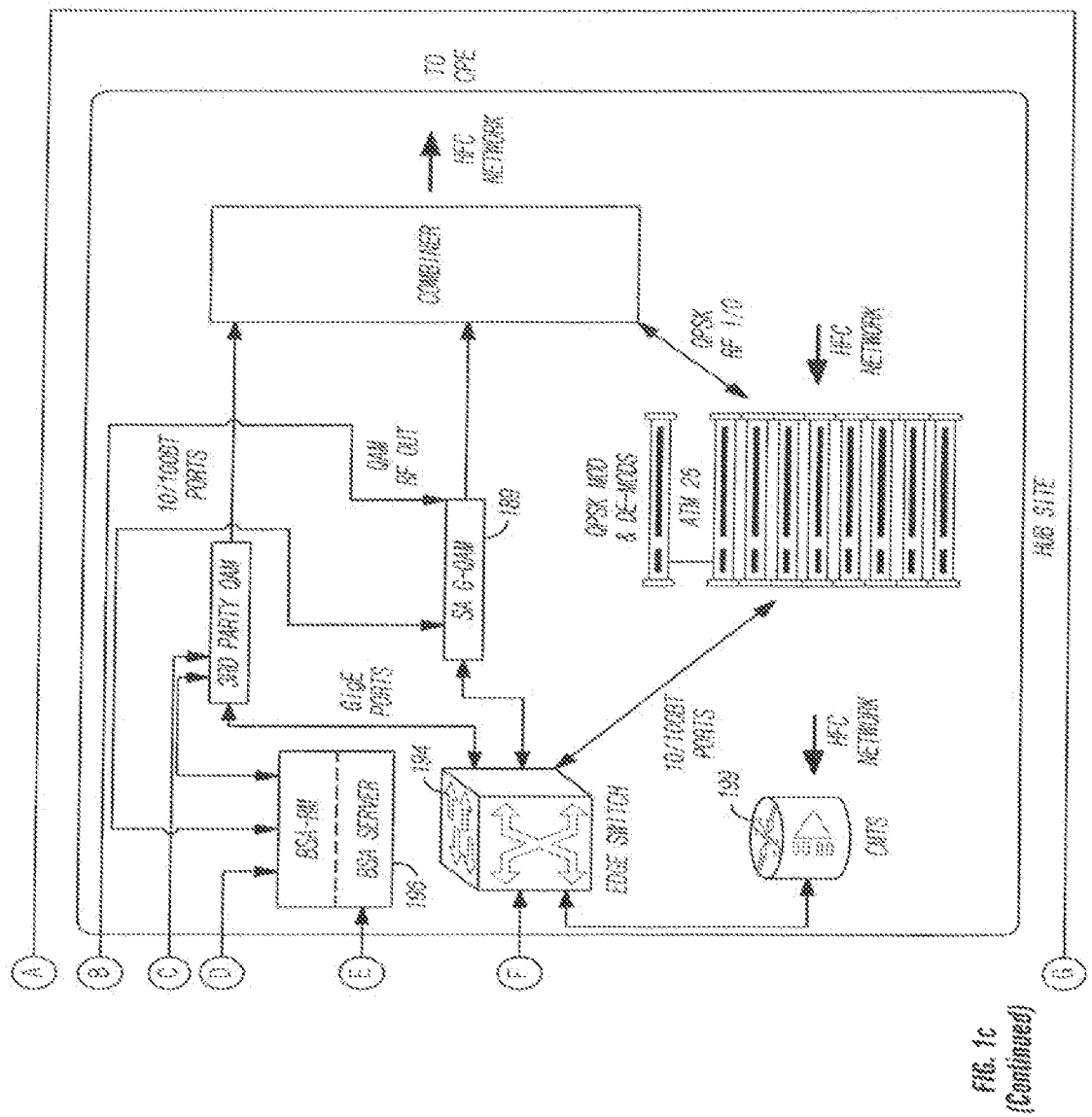

FIG. 1c illustrates an exemplary "switched" network architecture also useful with the present disclosure. Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also typically disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned U.S. patent application Ser. No. 09/956,688 filed Sep. 20, 2001, entitled "Technique for Effectively Providing Program Material in a Cable Television System", and issued as U.S. Pat. No. 8,713,623 on Apr. 29, 2014, incorporated herein by reference in its entirety, describes one exemplary broadcast switched digital architecture useful with the present disclosure, although it will be recognized by those of ordinary skill that other approaches and architectures may be substituted.

In addition to "broadcast" content (e.g., video programming), the systems of FIGS. 1a-1c can also deliver Internet data services using the Internet protocol (IP), although other protocols and transport mechanisms of the type well known in the digital communication art may be substituted. One exemplary delivery paradigm comprises delivering MPEG-based video content (e.g., "IPTV" or the like), with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable or other modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component. The edge switch 194 forwards the packets receive from the CMTS 199 to the QAM modulator 189, which transmits the packets on one or more physical (QAM-modulated RF) channels to the CPEs (or CD). The IP packets are typically transmitted on RF channels that are different than the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Packet-Optimized Architectures

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the present disclosure, a "packet optimized" delivery network is used for carriage of the packet content (e.g., IPTV content) when the request issues from an MSO network (see discussion of FIG. 2a below). FIG. 1c illustrates one exemplary implementation of such a network, in the context of an IMS (IP Multimedia Subsystem) network with common control plane and service delivery platform (SDP), as described in U.S. Provisional Patent Application Ser. No. 61/256,903 entitled "METHODS AND APPARATUS FOR PACKETIZED CONTENT DELIVERY OVER A CONTENT DELIVERY NETWORK", incorporated herein. Such a network provides significant enhancements in terms of common control of different services, implementation and management of content delivery sessions according to unicast or multicast models, quality-of-service (QoS) for IP-packetized content streams, etc.; however, it is appreciated that the various features of the present disclosure are in no way limited to any of the foregoing architectures.

Selective Enforcement Network Architecture

Figure 2:
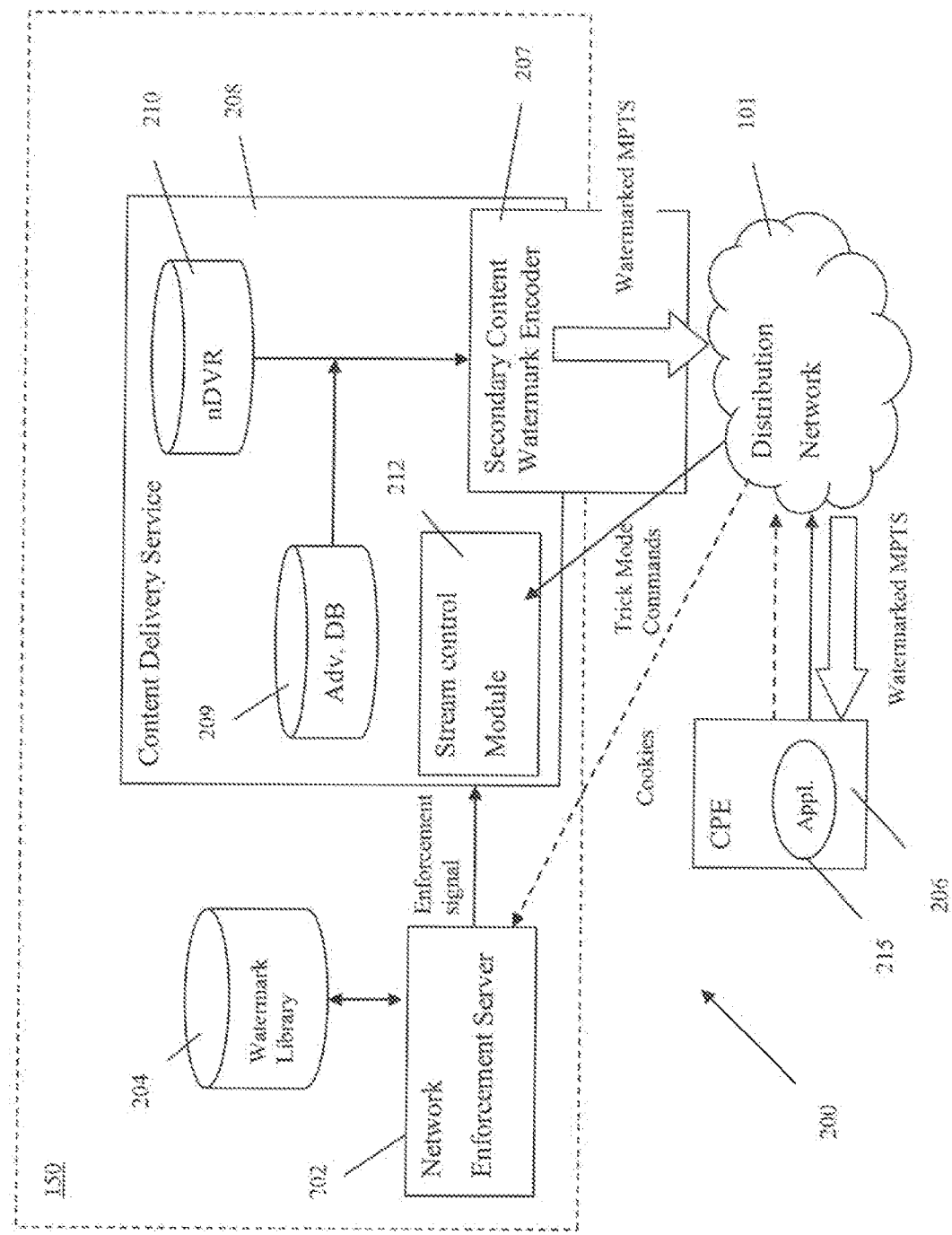
FIG. 2 is a high-level block diagram illustrating one embodiment of a network-centric selective enforcement architecture according to the present disclosure.

Referring now to FIG. 2, one embodiment of the network architecture specifically implementing the selective advertisement/promotional enforcement functions of the invention is shown and described. The system 200 of FIG. 2 is in the present embodiment disposed substantially at one or more cable or satellite network headends or distribution facilities, although it will be recognized that this is in no way a requirement, and in fact the components may be distributed among various different physical locations (and connected via network for example) as desired. See for example the alternate premises-based embodiments described infra with respect to FIG. 3. Moreover, different cable or satellite or other system headends may share components between them, and/or have multiple ones of components installed for e.g., redundancy/failover protection, different tasking or service, etc.

It is also envisaged that the methods and apparatus described herein may be implemented in the context of unmanaged networks, such as, e.g., the Internet. For instance, a cloud-based media streaming server may selectively restrict or enable its "trick mode" functions with respect to the streamed content based on "cookies" passed back up to the streaming server regarding the user's viewing of certain secondary content.

As shown in FIG. 2, the network architecture 200 includes a network server device 202 with associated database 204, content encoding apparatus 207, and network content storage and delivery service 208 with primary and secondary content sources or stores 210, 209. In the illustrated embodiment, the content delivery service 208 comprises one of a network DVR, "Look Back", or "Start Over" service of the type previously referenced herein, such as that described in co-owned U.S. patent application Ser. No. 10/913,064 filed on Aug. 6, 2004 and entitled "TECHNIQUE FOR DELIVERING PROGRAMMING CONTENT BASED ON A MODIFIED NETWORK PERSONAL VIDEO RECORDER SERVICE", or U.S. Pat. No. 7,457,520 issued Nov. 25, 2008 and entitled "TECHNIQUE FOR PROVIDING A VIRTUAL DIGITAL VIDEO RECORDER SERVICE THROUGH A COMMUNICATIONS NETWORK", each of the foregoing incorporated herein by reference in its entirety, although it will be appreciated that other types of services may be used consistent with the disclosure (including for example video-on-demand (VoD) or other on-demand delivery paradigms such as pay-per-view (PPV)). For instance, the selective enforcement function can be applied to previews associated with VoD or PPV movies; e.g., if the user/CPE requesting the movie has already seen a given preview (such as via a previous VoD or PPV order), they can FF or skip over it.

In the foregoing delivery models, users are enabled to utilize one or more trick mode functions such as STOP, FF, REW, PAUSE, PLAY, etc. as part of the content delivery. In one typical implementation, the commands sent from the user (e.g., via their remote control) are transferred upstream to the network server delivering the content, the server then either implementing the desired function, or in the case of use restrictions, not implementing the function (e.g., FF for advertisements entrained within network DVR 210 or Look Back content). Hence, the illustrated architecture 200 of FIG. 2 builds upon and modifies this extant trick mode logic, specifically by determining whether to enable certain functions based on prior viewing. Specifically, the server device 202 receives "cookie" information from the relevant CPE 206 (as discussed in greater detail below) regarding viewing of secondary content, and updates the relevant portions of the database 204 to in effect remember what secondary content has been watched by what CPE (and when).

To implement this capability, the content encoder 207 of the architecture 200 encodes the secondary content inserted from a content source or store 209 present in the program streams (which in one embodiment comprise multiplexed ATSC MPEG-2 transport streams, or MPTS) using, e.g., a digital watermark disposed in the audio track of the secondary content. Hence, the delivered multiplexed transport stream may carry several different secondary content elements, each of which may be encoded with a distinct watermark to uniquely identify the element (and/or one or more attributes associated with the element).

An advertising management subsystem or AMS (not shown) selects individual ones of a plurality of secondary content for insertion into individual ones of the program streams from the secondary content store 209. The AMS may, in one embodiment, be adapted to comply with the requirements set forth in the Society of Cable Telecommunications Engineers SCTE 130-1 and SCTE 130-3 Digital Program Insertion—Advertising Systems Interfaces standards, which are incorporated herein by reference in their entirety. Advantageously, the methods and apparatus of the present disclosure can be used with any number of different advertising insertion or splicer architectures, whether analog, digital or hybrid in nature. See, for example, co-owned U.S. patent application Ser. No. 10/662,776 filed Sep. 15, 2003 entitled "SYSTEM AND METHOD FOR ADVERTISEMENT DELIVERY WITHIN A VIDEO TIME SHIFTING ARCHITECTURE", issued as U.S. Pat. No. 8,214,256 on Jul. 3, 2012, which is incorporated by reference herein in its entirety, for exemplary advertising insertion and splicer apparatus and methods in the context of, e.g., networked digital video recorder (nDVR) or VoD delivery paradigms.

When a given requesting premises receives the MPTS, its CPE 206 uses a PID filter or other comparable mechanism to identify the individual program stream of interest, and extract the packets associated with that stream for reassembly of the stream by the CPE/rendering device. Associated with the secondary content elements are the watermarked audio tracks. An algorithm 215 running on the CPE (such as those used to detect the exemplary NMR watermarks discussed below) evaluate the audio track(s) of the extracted program stream (e.g., a cloud-stored version of a linear broadcast channel having advertisements) to find the watermarks and hence identify the advertisement(s).

In one implementation, all broadcast and MSO network linear programs and advertisements are encoded with NAVE audio watermarks. These audio watermarks are retained when a real time acquisition is performed by the MSO (as well as when the user records the content to a DVR). Audio watermarking is in one variant applied before the content is received at the MSO headend(s) for, inter alia, network advertisements; it is performed at the programmer's origination site. However, it will be recognized that the watermarking can be applied at other locations, including by the MSO.

Once the watermarks have been detected, information relating to them is transmitted upstream to the server device 202. As discussed subsequently herein with respect to FIG. 5, various embodiments of the disclosure will have the CPE 206 and server 202 perform various different functions to effectuate the ultimate selective enablement function previously described.

For instance, in one configuration, the CPE may merely pass the raw watermark data to the server 202 for further analysis and identification (and search of the database 204). In this case, the database 204 is in one variant further configured to include a listing or library of watermark data so as to enable the server 202 to uniquely identify the advertisement via the received watermark data. In another variant, the database 204 merely contains a library of watermarks; the server 202 searches the watermarks for the CPE of interest (as determined by, e.g., a MAC or IP address, account ID, or other indicia of the CPE) for a bit-wise match for the received watermark, and if a match is found in the database for that CPE, a signal or message is sent to the stream control module 212 (or other cognizant entity) of the delivery service 208 to enable the FF or "skip" functions.

In one exemplary embodiment, the database 204 associated with the network device 202 is configured to store on the order of 1E07 to 1E08 viewing events at any given time, although this number is merely illustrative. For example, assuming an average of 250 hours of viewing per premises/household per month, and approximately 26 impressions per hour per premises, a maximum number of 6500 total impressions per premises per month is obtained. When multiplied by the number of premises served or monitored by a given network device 202 and database 204, which for example might be 100,000, a number of roughly 6.5E07 (65 million) events per month per server is obtained, which is well within extant data storage and processing capacity.

In one implementation, an approach akin to the well-known "cookie" is utilized for obtaining the desired viewing data from the various subscribers of the network. As a brief aside, a cookie (also known as an HTTP or HTTPS cookie, web cookie, or browser cookie) is an arbitrary piece of textual data used for instance for an origin website or server to send state information (i.e., information relating to previous events, akin to a memory) to a user's browser, and/or for that browser to return state information to the origin site/server. The state information can be used for any number of purposes including without limitation authentication, identification of a user/user session, user preferences, etc. Without cookies, each retrieval of a Web page or component of a Web page is an isolated event effectively unrelated to all other interactions with the pages of the same site. Cookies may also be set via other means, such as, e.g., via a script in a language (e.g., JavaScript).

Hence, in the exemplary implementation, the network side device 202 exchanges one or more cookies with each CPE 206, so as to inter alia obtain state information as to the viewed secondary content. The state information is generated in one embodiment by an application process running on each of the CPE which extracts the audio watermark data (discussed in greater detail below) and creates the necessary data structures for transmission back to the network device 202. This transmission may take on any number of forms/protocols (e.g., rendered in HTTP/HTTPS, Javascript, etc.), or may even use extant signaling messages or protocols within the network that have been "piggybacked" or repurposed for such transmissions. The operation and function of the foregoing architecture and components is merely one possible architecture for implementing the inventive functionality; see for instance the alternative architecture of FIG. 3 discussed infra. Moreover, various of the subsystems and components shown in FIG. 2 can be combined with others, or functions performed thereby distributed across different functional (e.g., hardware or software) entities already within the content delivery network.

Watermarking

The Nielsen Audio Video Encoder (NAVE) is a system capable of inserting Nielsen Media Research proprietary NAVE source identification watermarking directly into the audio portion of compressed digital ATSC transport streams prior to broadcast. NAVE devices can simultaneously insert watermarking data on multiple independent digital television programs being broadcast whether they are standard definition (SDTV) or high definition (HDTV).

Encoding of television signals such as in the Nielsen system is used for audience measurement; e.g., to accurately identify television distributors (including broadcast stations or cable networks). The Nielsen Media approach installs meter devices at user premises being monitored to identify stations and networks by reading the aforementioned watermarks or other codes inserted into the television signal at the distribution source through the NAVE unit. By encoding content with a NAVE unit, ratings data for programming can be provided, whether it is received in a digital, analog, or combined viewing environment.

In one implementation, the installed meter device detects and extracts the codes (watermarks) contained in content signals that are delivered to the premises. These watermarks can be matched to a "library" to identify the content.

If any station's NAVE encoder is interrupted, the meter device installed in Nielsen sample premises collects and store passive signatures for all non-encoded programming viewed. These signatures are downloaded each night to Nielsen's operations center. To identify viewing, the passive signatures collected from the meter device in the premises are matched against the signatures in the library.

U.S. Pat. No. 6,901,606 to Wright, et al. entitled "Method and apparatus for detecting time-compressed broadcast content", and U.S. Pat. No. 6,272,176 to Srinivasan entitled "Broadcast encoding system and method", each of the foregoing incorporated herein by reference in its entirety, describe various aspects of the exemplary NAVE encoder and related techniques, which can be used in one embodiment to insert audio encodings or watermarking. Various extant commercial devices which can perform such encoding also exist, including for example the Wegener NAVE IIc™ device, or that manufactured by Ross Video (Norpak), which support the ability to code pre-compressed MPEG-2 transport streams. For example, the Wegener NAVE IIc™ encoder inserts NMR (Nielsen Media Research) audio watermarking data into MPEG-2 Multi-Program Transport Streams compliant with the ATSC standard(s).

While the exemplary embodiments described herein are discussed as utilizing audio watermarking or code insertion, it will be appreciated that the present disclosure is in no way so limited, and in fact other mechanisms for inserting codes or information which can be identified by a receiving or rendering device can be used consistent with the present disclosure, including without limitation: (i) video watermarking; (ii) out-of-band or side-band encoding; (iii) so called "hint tracks" such as those specified in the ISO base media file format set forth in ISO/IEC 14496-12 (MPEG-4 Part 12), which is incorporated herein by reference in its entirety, or (iv) audio content recognition, such as that used by services such as e.g., Shazam®.

In another embodiment, the commercially available Rentrak VoD-based tracking solutions (e.g., OnDemand Essentials) can be utilized consistent with the present disclosure to provide, inter alia, tracking of activity or content.

Premises-Centric Embodiments

Figure 3:
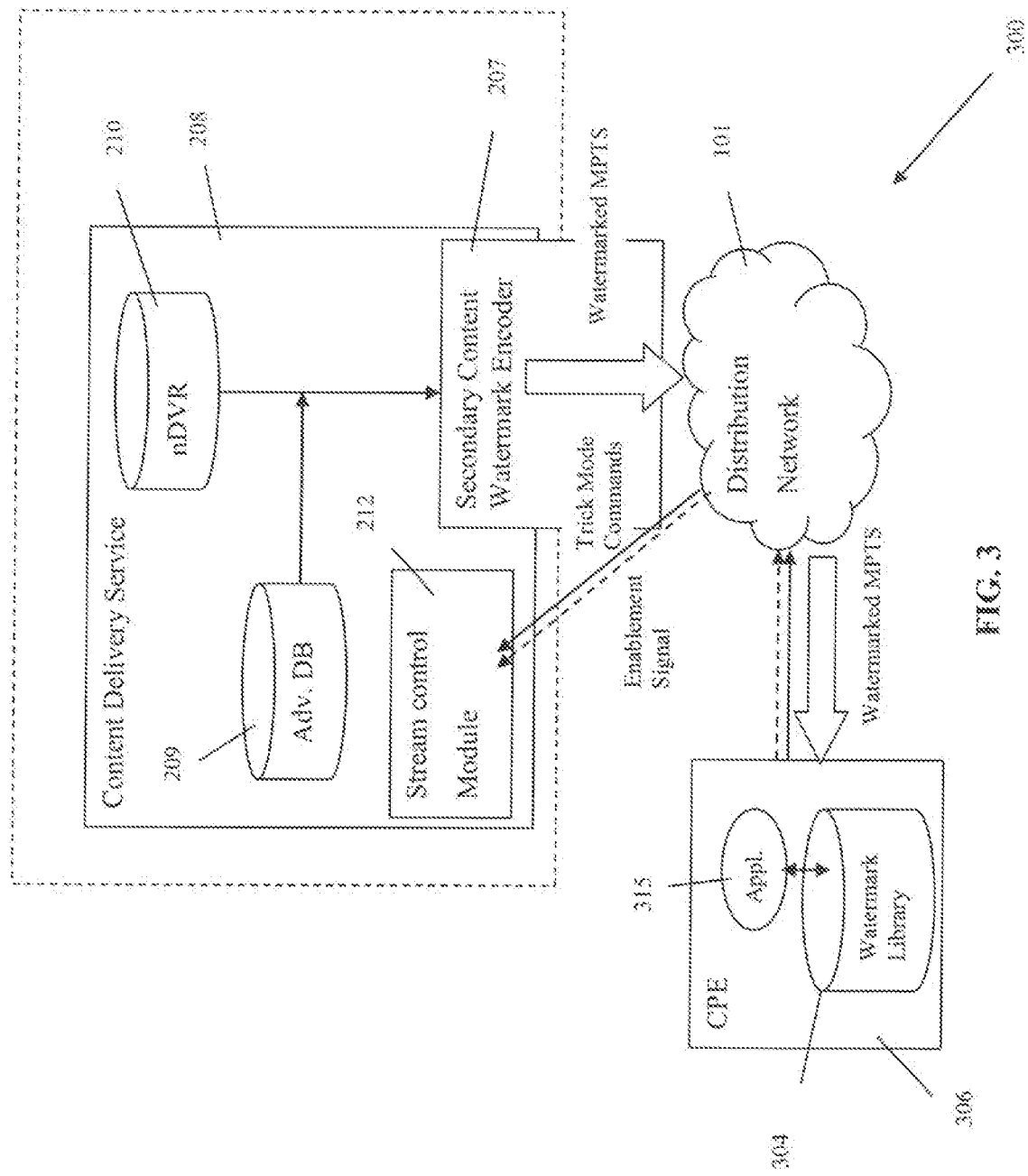
FIG. 3 is a high-level block diagram illustrating one embodiment of a premises-centric selective enforcement architecture according to the present disclosure.

Referring now to FIG. 3, another embodiment of the selective enforcement functional architecture is shown and described. In this embodiment, the architecture 300 leverages an application 315 and watermark database 304 retained on the CPE 306 to determine whether a given function (e.g., trick mode) should be enabled. Hence, in this approach, the decision on whether to enable/disable trick mode or other such functionality for a given user/CPE is decentralized and given to each individual CPE, as opposed to being made by a centralized server 202 such as in the architecture 200 of FIG. 2. The logic within the exemplary CPE 306 is in one implementation configured to: (i) extract every watermark encountered as part of the received and viewed media streams, (ii) determine if the extracted watermark is already in the database, and (iii) store the extracted watermark in the database 304 if not already present, such as for a given period of time (e.g., one month, on a FIFO or similar basis). If the extracted watermark is not found in the database, any of the designated trick mode commands destined for the network content server are modified or accompanied by a "disable" signal, or alternatively the CPE 306 merely blocks the signal. If the watermark is found (indicating that the user has seen the watermarked content previously within the prescribed FIFO period), then the function operates normally; i.e., is enabled.

The architecture 300 of FIG. 3 has the advantage of, inter alia, having each CPE retain data only for itself (or its connected devices), thereby (i) obviating upstream communications of watermark data, and (ii) ostensibly minimizing processing overhead and latency for watermark searching, since the database to be searched is much smaller (by a factor of 100,000) or so, or at very least must be indexed on a per-CPE or per-account basis.

Moreover, the architecture 300 of FIG. 3 eliminates the network server 202 of FIG. 2, since all selective enforcement logic is effectively contained within the CPE 306. It also obviates having to send CPE- or user-specific information regarding user habits or viewing to the network, thereby providing a degree of privacy for the user.

However, it also requires a "thicker" CPE, and may be prone to surreptitious manipulation by a user (e.g., to permanently enable all trick mode functions). Compilation of data for network-wide analysis or the like is also frustrated.

Notwithstanding, it will be appreciated that various hybridizations of the embodiments of FIGS. 2 and 3 may be utilized consistent with the disclosure; e.g., the architecture 300 of FIG. 3 may also have the server 202 of FIG. 2, such as for the receipt of data from each CPE for, e.g., the aforementioned network-wide analysis, targeted advertising insertion functions, implementation of rules-engine policies (discussed below), etc.

Methods

Figure 4:
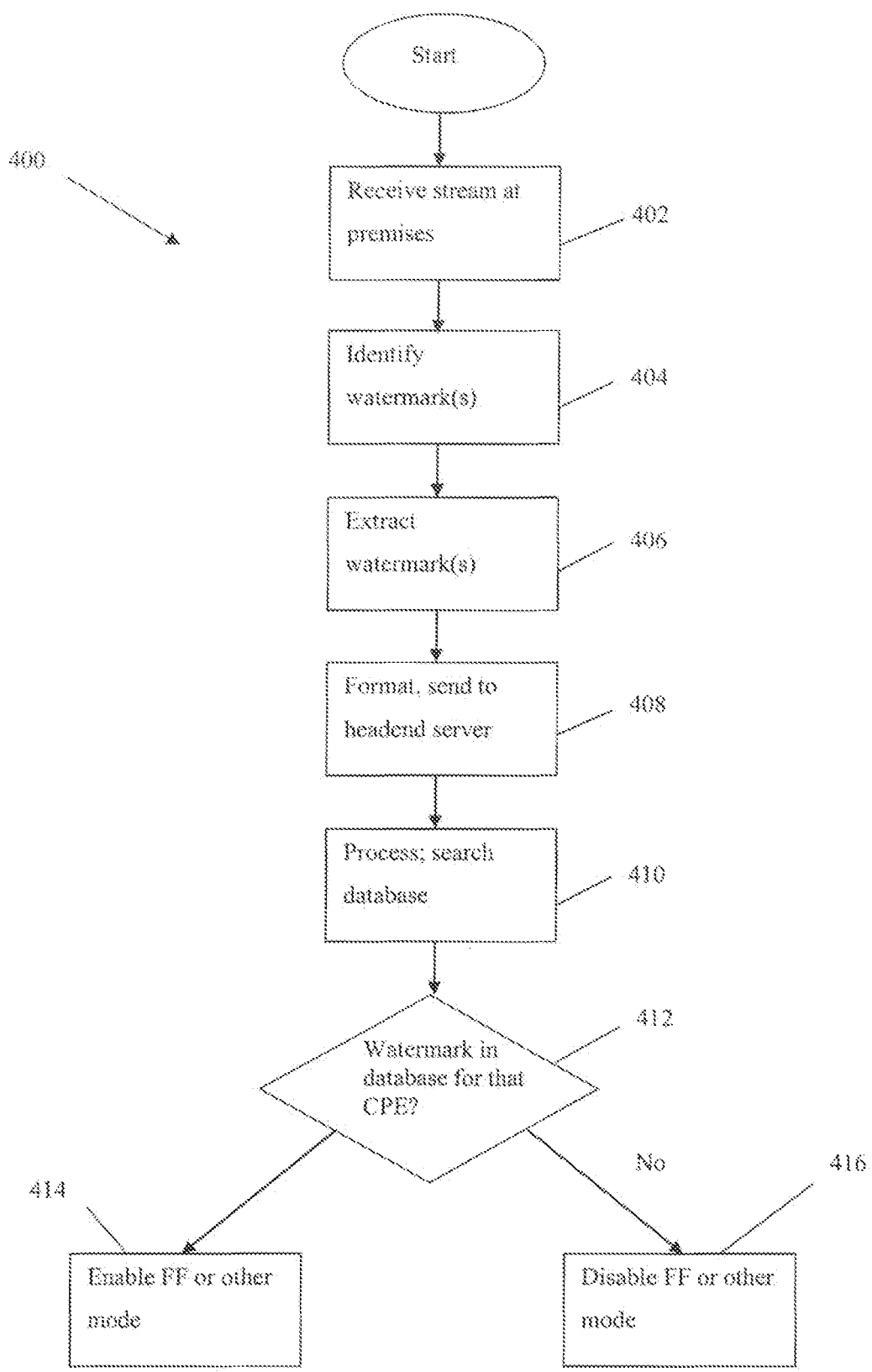
FIG. 4 is a flow diagram illustrating a first embodiment of a method of selectively enforcing functional restrictions according to the present disclosure.

Referring now to FIG. 4, one embodiment of a generalized methodology 400 of selective enforcement of functions for content distribution is described. This embodiment is geared towards the architecture 200 of FIG. 2 above.

As shown, the method first includes receiving one or more program streams at a user premises per step 402. For example an MPTS is received via the HFC network of FIG. 1, or a packet stream is received via another bearer (e.g., a TCP/IP layer stream over a bearer such as an optical fiber or wireless link).

Per step 404, the stream is examined, and any watermarking or other relevant coding associated with secondary content contained therein is identified. For instance, in one variant, the aforementioned exemplary NAVE watermarking is used within audio tracks associated with the received content.

Per step 406, the identified watermarks or codes are extracted.

Per step 408, the extracted watermarks or codes are optionally formatted (such as to include a CPE ID, such as a MAC or IP address, user account data, etc.) and transmitted upstream (e.g., via OOB channel or other bearer) to the network server 202.

Per step 410, the watermarks are processed as required by the server 202, and the database 204 accessed to identify any instances of prior viewing by the designated CPE of that content. In one variant, the server 202 uses the watermark to affirmatively identify the associated secondary content (e.g., by an advertisement ID or the like), and then search the database 204 based on that ID. Alternatively, a "brute force" search of the watermark bit-stream (e.g., for a bit-wise match) is performed. Many other variants of identifying the watermark within the database will be recognized by those of ordinary skill given the present disclosure.

Per step 412, based on the outcome of the search of step 410, the designated functionality (e.g., FF or skip) is either enabled (step 414), or disabled (step 416).

Figure 5:
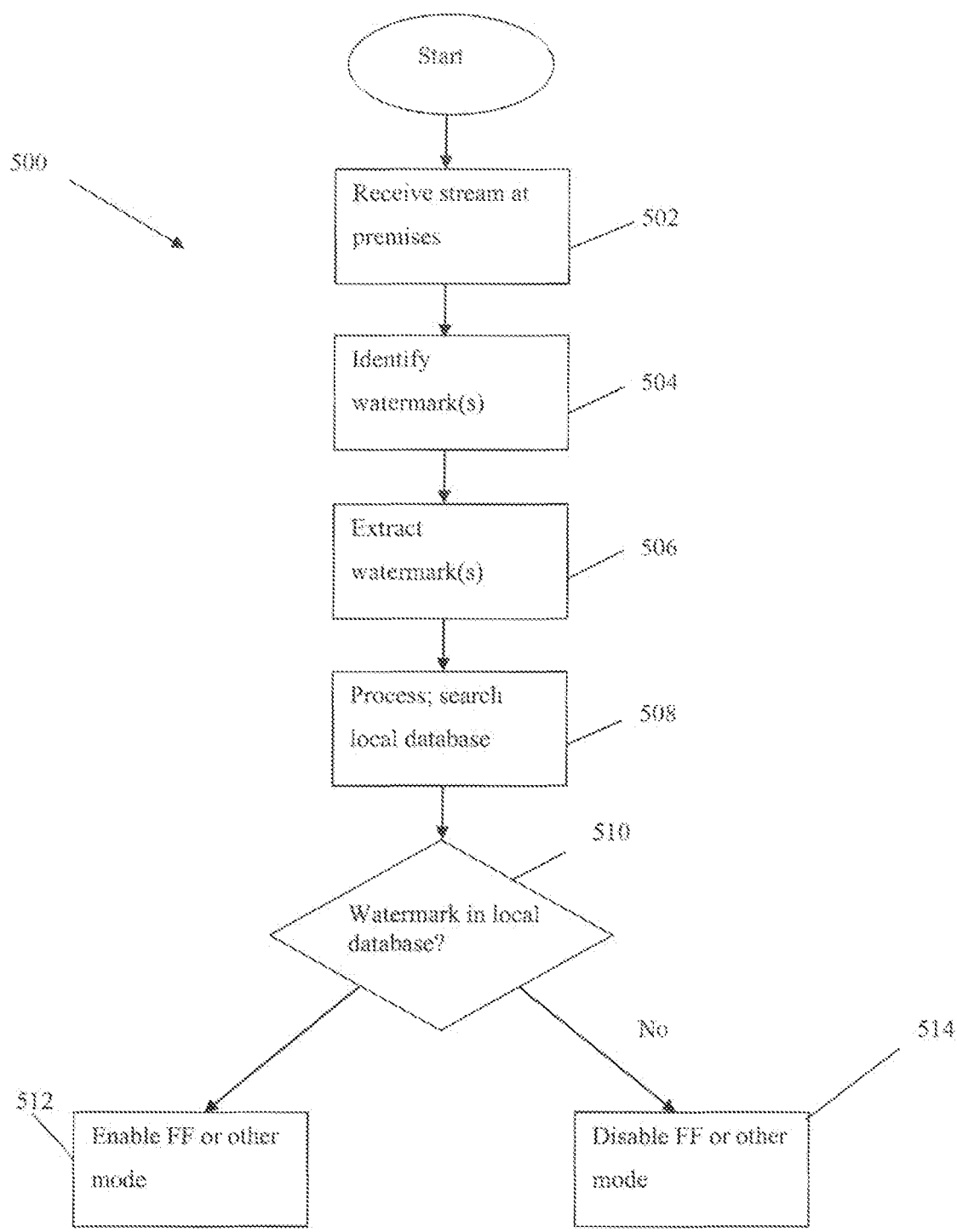
FIG. 5 is a flow diagram illustrating a second embodiment of a method of selectively enforcing functional restrictions according to the present disclosure.

Referring now to FIG. 5, one embodiment of a generalized methodology 500 of selective enforcement of functions for content distribution is described. This embodiment is geared towards the architecture 300 of FIG. 3 above (i.e., is premises-centric).

As shown, the method first includes receiving one or more program streams at a user premises per step 502. Again, an MPTS is received via the HFC network of FIG. 1, or a packet stream is received via another bearer (e.g., a TCP/IP layer stream over a bearer such as an optical fiber or wireless link).

Per step 504, the stream is examined, and any watermarking or other relevant coding associated with secondary content contained therein is identified. For instance, in one variant, the aforementioned exemplary NAVE watermarking is used within audio tracks associated with the received content.

Per step 506, the identified watermarks or codes are extracted.

Per step 508, the extracted watermarks or codes are optionally processed (such as to facilitate their subsequent search within the local database 304), and the database 304 is accessed to identify any instances of prior viewing by the designated CPE of that content. As above, in one variant, the CPE 306 uses the watermark to affirmatively identify the associated secondary content (e.g., by an advertisement ID or the like), and then search the database 304 based on that ID. Alternatively, a "brute force" search of the watermark bit-stream (e.g., for a bit-wise match) is performed. Many other variants of identifying the watermark within the database will be recognized by those of ordinary skill given the present disclosure.

Per step 510, based on the outcome of the search of step 508, the designated functionality (e.g., FF or skip) is either enabled (step 512), or disabled (step 514). For instance, in one implementation, a state variable is maintained with the CPE 306, such that any subsequent trick mode commands initiated by the user check the state variable (e.g., "go/no-go") as to whether the function will be allowed.

Other Variants

In another embodiment, information relating to the context of an advertisement or promotion is used to determine eligibility for selective enablement. For instance, in one variant, an advertisement having a context which is sufficiently related to that of one already viewed is made eligible for the FF or skip functions. Other variations of this general approach are recognized as well, including e.g., correlation of two advertisements from the same advertiser/entity, correlation of two advertisements for similar goods or services, etc.

In another embodiment, the temporal component of a user's activity is evaluated to identify activity of interest. For example, in one variant, the "freshness" of a viewer's previous view of an advertisement is evaluated, such as by calculating the time between when the advertisement was last viewed and the present time. If a prescribed criterion (e.g., within the last month) is met or exceeded, the aforementioned selective enablement is not conducted, and the user must view the advertisement.

In another embodiment, an advertiser may use a series of advertising spots to create a "story" (i.e., the advertisements build off one another to create a linked chain of events which spans the entirety of the advertisements). Using, e.g., cookies or other similar mechanism, a particular user's position within the story is tracked. In this manner, the system may automatically provide the advertisements in sequential order to the user. The user is thus more engaged and interested in the advertisement, as he is able to recollect and enjoy the overall story. Alternatively, the user may be required to indicate to the system to move from one "episode" to another within the advertisement series. The requirement that the user affirmatively select where he is within the advertisement series results in an ability of the system to obtain highly specific information regarding the user's past and current interaction with the advertisement series.

In an additional variant, the aforementioned advertisement series is tied across various networks. In other words, a user may pick up on a next "episode" in the advertisement series (either manually or automatically) despite the network or device on which the user accesses content. This may be accomplished via an identification or determination of the identity of the user, such as by authenticating the user (e.g., by a password and log-in information).

Another embodiment includes enabling a user to use a remote control or other mechanism to skip an advertisement if the user has at some previous time viewed the advertisement. A Nielsen view may then be assigned to the advertisement and one or more alternative advertisements may be provided. In one variant, different offers or "closers" may be provided to the user if it is noted that he has performed multiple advertisement skips. The advertisement skips may be identified or grouped based on, e.g., whether the user is consistently skipping the same advertisement, the same genre of advertisement, etc.

In another variant, the existence of changes to the advertisement in the intervening time period are evaluated. For example, if the previous advertisement that was viewed by a given subscriber relates to a given product or service, and that advertisement (or the product/service) has been updated in the interim, then even though the user had viewed the prior version of the ad, it must again be viewed. Varying approaches for calculating "proximity" of two advertisements will be recognized by those of ordinary skill given the present disclosure, including without limitation: (i) context-based; (ii) temporal; (iii) changes in version, etc.; (iv) common advertiser; (v) common product/service, and so forth.

It will also be recognized that the same advertisement may carry different watermarking when broadcast or transmitted at different times. Accordingly, the present disclosure contemplates variants where the relevant database of watermarks is cross-correlated or linked, such that searching on a first watermark associated with an advertisement will also retrieve or identify a second watermark, akin to a single person having two names.

In yet another embodiment, the user is provided the ability to swap or exchange an advertisement for another. For instance, in one variant, an advertisement of equal duration is swapped in (or is otherwise resident in the program stream) such that the user can skip the first advertisement in favor of the second one.

In another aspect of the disclosure, new "trick modes" are disclosed. One such trick mode is an "auto-skip" mode, which when enabled, automatically skips the program stream from the extant viewing point to the end of a secondary content element that has been enabled. In one variant, the auto-skip if from the extant viewing point to a point within the secondary content which has not been viewed (e.g., where a subscriber had only viewed a portion of an advertisement, the skip would take the user to the remaining portion not previously viewed).

Another trick mode disclosed herein is the "swap" mode, which as previously described, allows the user with one touch to exchange a given advertisement for another one.

In another aspect of the disclosure, the user activity related to use of the FF, skip, swap, or other such functions is evaluated and used as a basis for charging an advertiser for placement of an advertisement. For instance, in one embodiment, the user skipping over an advertisement previously viewed is counted as an "impression credit" for the advertiser, and hence the fee or other consideration charged the advertiser is adjusted based thereon. While it is often difficult to tell whether a given user actually watched a given advertisement (i.e., were they talking on the phone, away from the TV, mentally engaged, asleep, etc.), a user who affirmatively skips or swaps an advertisement is definitely known not to have viewed the advertisement (or at least the portion occurring after the skip/swap), and hence this information can be used by the network operator or advertiser.

In another embodiment, the skip or swap functions are invoked for an entire program stream or segment. For instance, in one variant, the user has requested playback of cloud-stored primary content such as a football game (which lasts several hours), and all the advertisements queued up for that entire duration are evaluated for prior viewing/enablement. If all the advertisements queued have been previously viewed by that user, they are removed from the stream such that the user receives effectively continuous primary content with no interruptions (although the programmer/operator may selectively insert other material if desired). Alternatively, the already viewed advertisements can each be replaced for other (unseen) advertisements or promotions.

In another embodiment, the user is given the opportunity to "fuse" data from multiple sources or devices together on their CPE (or another platform, such as their mobile wireless tablet computer) relating to secondary content they have viewed. For example, in one implementation, advertisements viewed by the user while watching television or content on their tablet are identified, and information relating thereto stored on the tablet. When the tablet comes in range of a wireless node in communication with the user's CPE (e.g., the user's Wi-Fi AP, or one indigenous to the CPE itself), the mobile device downloads the stored data to the CPE, the latter of which uses this data to populate/update its own internal database. Hence, the user will not be presented (or can skip or FF through) advertisements on their premises rendering device (e.g., TV) that they have previously viewed on another platform. In some implementations, the data can be pushed to the CPE (e.g., via WAP 2.0 push or the like), or alternatively to a network server, and the CPE can periodically or situationally download the pushed data from the server so as to maintain its database updated.

In another embodiment, a given advertisement is selectively replaced with a different (e.g., shorter) version thereof based on the viewer's prior history or activity. In one such variant, the shorter version is a "micro" or mini-ad, such as a 1-5 second spot which is intended to briefly get the user's attention, but which is completed so rapidly that the user need not take any action. For instance, if a viewer had previously watched a full-length advertisement for Coca Cola™ (e.g., 30-seconds long), the program stream would be amended to include a 3-second "Thirsty? Drink Coke!" spot, reminding the user of the product/service associated with the full-length ad. The spot version may conceivably be so short as to barely be perceptible to the user; e.g., flashing a picture of a can of Coke™, somewhat akin to prior art subliminal advertising, yet longer in duration.

The foregoing shorter advertisement version replacement may be further employed when a viewer selects a fast-forward or skip option. In other words, when the viewer enters a command to skip or fast-forward an advertisement, the original advertisement is replaced with a pre-recorded alternative (i.e., a short version advertisement). Prior to broadcast, the advertiser provides a plurality of advertisements in full length as well as in shortened form. In the above embodiment, the full-length advertisement is delivered to the user; then, upon selection of the fast-forward command, the full-length version is swapped for the shorter version. The previously referenced delivery mechanisms (discussed above with respect to FIGS. 1-1d) may be utilized for delivery of each of the full-length and shortened advertisement versions.

In one alternate implementation, both the full-length and spot advertisements are present in the program stream as delivered to the user (e.g., in sequence with one another); the logic in the user's CPE merely chooses which version to render (and hence skip the non-rendered version).

In yet another embodiment, a user is enabled to "thumbnail" advertisements or promotions that they have already seen, such as using a small window (e.g., akin to PIP) generated on the user's display. Hence, the user can watch the primary content in parallel with the ad, with little disruption of the advertisement running in the window.

In a further variant, the user can be enabled to "shuffle" the advertisement placement or order. For example, in the case of the foregoing exemplary football game, the user may want to view all of the previously unviewed advertisements in the program stream for the game at the beginning, or at half time, or after the first quarter, etc. This gives the user the ability to effectively avoid watching advertisements in some cases, such as where the game is boring or one-sided, and the user does not desire to watch the second half. By placing all of the advertisements at halftime of such a game, the user has not expended any time watching the advertisements they would have otherwise watched, since they all have been delayed until halftime.

In one such implementation, a user's mobile device (e.g., tablet computer) is used as the rendering device, and the touch-screen input is used to render thumbnails of the advertisements during the program stream. The user then merely drags the advertisements with their finger to the place they wish to view them within the program stream.

The network operator or advertiser(s) may obviously impose restrictions on the foregoing; e.g., so as to avoid users moving all advertisements to the very end of the program stream. However, such activity could be permitted for example in cases where the user had already viewed the advertisement.

In another embodiment, users traversing a program stream (such e.g., as a VoD or Start Over or Look Back stream) are presented with a menu or other logical construct (e.g., dynamically generated icons or other interactive mechanisms) when reaching an advertisement, and the traversal is suspended until the user chooses a logical branch for the given advertisement. For example, in one implementation, users fast-forwarding (FF) through Start Over content provided by a network operator are presented with an on-screen menu upon encountering an SCTE 35 cue or other embedded marker within the stream, the menu giving the user a plurality of options, such as, e.g.: a) watching the advertisement; b) affirmatively skipping all or a portion of the advertisement; c) saving the advertisement for later viewing; d) marking the advertisement as a "favorite" or otherwise denoting it as belonging to a particular category of relevance to the user (e.g., "most obnoxious ads", "car ads" etc.); and/or e) seeing an expanded or related content segment (e.g., seeing a full trailer for an advertisement for a movie, or trailers for movies of similar genre, director, actors, etc.). Hence, each of the foregoing represent a different logical "branch" which the user must take in order to dispense with the advertisement and continue their traversal of the program stream.

It will accordingly be appreciated that the different logical branches may produce a different temporal aspects or timelines, and hence require adjustment by the network-based delivery mechanism. For example, a user affirmatively skipping an advertisement will in effect shorten the program stream by being allowed to skip over the advertisement. Similarly, a user requesting a full movie trailer will lengthen the stream. Saving an advertisement for later will require the advertisement to be inserted at some later time, whether within the same program stream or another (e.g., the disclosure contemplates that the "save for later" and in fact other options may transfer between program streams and in fact modalities, such as for instance where an advertisement saved for later in a Start Over session may be later viewed as part of a Look Back session). Accordingly, advertisement removal and insertion can in one embodiment be conducted "on the fly" using well known advertisement splicing techniques, such as for instance those described in commonly owned U.S. Pat. No. 8,099,757 issued on Jan. 17, 2012 and entitled "Methods and apparatus for Revenue-Optimized Delivery of Content In a Network", which is incorporated herein by reference in its entirety.

The foregoing menu functionality may also be utilized consistent with a mechanism whereby the user need not provide input to the menu or respond. For example, in one variant, a user's lack of input or interaction with the menu can be used as a basis for further action, which may include for instance playing the advertisement that generated the menu, or swapping out the advertisement for another that may be more germane or of greater interest to the user, such as based on demographics, pyschographics, historical behavior, explicit user preferences, etc. In one implementation, the foregoing functionality is associated with a timeout period, which may be statically or dynamically imposed. As one example of the latter, a user's historical activity with respect to advertisements and the menu is evaluated for statistical parameters that can be used as a basis for speculation on the user's future behavior. For example, a user who has not interacted with the last five (5) advertisement menus while in FF mode can be speculated to have a low probability of interaction on the next instance. Likewise, a user who frequently interacts with certain functions can be speculated to have a higher likelihood of such interaction in the future. To this end, a histogram or other similar mechanism can be developed that can be used to guide functions such as population of the menu (seldom used functions can be speculatively eliminated from the menu), the functionality of the individual functions on the menu (e.g., timeouts can be specified or set at different values for functions that are used more or less frequently, or a broader scope of submenu options specified for more frequently used functions).

It will be appreciated that the various options on the aforementioned menu may be altered dynamically, such as, for example, based on: (i) the type of mechanism by which the user is obtaining the content (e.g., VoD, Start Over, etc.); (ii) the identity of the user/user household, including any particular demographic, psychographic, or historical contexts or considerations associated therewith; (iii) operational considerations or limitations of the delivery network (e.g., bandwidth limitations); (iv) advertising content attributes (e.g., ratings; a full move trailer or adult-themed advertisement may be precluded by a parental control function for children due to its rating for instance; or a longer run-time advertisement may have different menu options associated therewith as compared to a shorter one); (v) date and/or time of day (e.g., more or less options or flexibility might be provided to users during prime time versus late-night or early morning viewing); and/or (vi) the subscription level of the user (e.g., higher-level subscribers may be given more options or flexibility in use of the options). The foregoing dynamic menu logic may be implemented entirely on the network side, by way of a local application or logic running on the user's CPE, or some combination thereof. Accordingly, a given user may see their menu options change literally from advertisement to advertisement, and/or in a more progressive manner over time, depending on the granularity and metric(s) selected by the MSO or advertiser for the dynamic menu alteration function.

It will also be recognized that the various menu functions may not have equal stature. For instance, certain options may provide the network operator enhanced revenue as compared to others (i.e., a user affirmatively viewing an advertisement can be counted as an "impression" for purposes of billing an advertiser, whereas an affirmative skip by the user is a definite non-impression). A "save for later" might eventually mature into an impression, but is inchoate in this regard, since there is no guarantee that a user will ever watch it later (unless it is enforced, as described elsewhere herein). Hence, certain options are clearly more desirable for different entities in a particular circumstance than others. Accordingly, these various functions can be weighted or otherwise apportioned, such as among one or more users, one or more programs, one or more advertising campaigns, etc. For instance, in one such implementation, a "credit" system is used, whereby a user can accrue/deplete advertisement credits for various menu functions selected. For example, in the foregoing context, an affirmative "view" selected on the menu accrues n number of credits for that user (or CPE or household, depending on the particular model selected). These credits are saved in a "bank" for later use by the same user/CPE/household, such as in the case where the user inserts an affirmative "skip" command, in which case n credits are subtracted. A "save for later" selection by the user may accrue a lesser number of credits (e.g., n/2), since the impression is inchoate as discussed supra; in one variant, the user is given the remaining n/2 credit when they actually view the saved advertisement. Note that the credits may be tied to any basis the MSO or advertiser desires, including impressions (discussed above), duration (e.g., longer ads correlate with more credit), timing (prime time viewing of ads may accrue more credits than non-prime time). Moreover, the credits/debits may be applied across multiple different advertisers/campaigns, or restricted to one (e.g., such that each different campaign has its own user/CPE/household "bank account"). Credits/debits may be accrued on a user basis across multiple devices as well; e.g., credits accrued on a user's premises CPE (e.g., DSTB) may be added to those accrued on their mobile device for the same advertiser campaign. The disclosure also contemplates that users can trade credits or give them away; e.g., to another family member or friend.

As another example of weighting or apportionment, certain functions of the menu may only be available at certain times or certain frequencies with respect to others. For instance, the "affirmative watch" function might always be available irrespective of any other considerations or factors, whereas the "skip" function may only be available at a reduced frequency, or as a function of dynamic variables as discussed above (e.g., only during non-prime time).

Myriad other combinations and permutations of dynamic control and/or apportionment will be recognized by those of ordinary skill given the present disclosure, the foregoing being merely illustrative of the broader principles of the disclosure.

It will further be appreciated that the foregoing menu functions can in certain implementations be combined, or multiple ones selected. For instance, the menu or other construct discussed above may be configured such that the user can select multiple ones of the options, such as "watch now" and "save for later". The menu may also be configured with submenus or other functional structures (e.g., icons, telescoping features, hyperlinks, etc.) so as to provide more detailed or complex functions/options. For example, in the exemplary "save for later" function, the user might be given options to save for one hour later, one day later, one week later, next time they view the given channel associated with the ad, etc.

In another embodiment, the skip or fast-forward command when employed during an advertisement may cause display of the advertisement with a reduced number of frames (for example half of the frames may be dropped). Alternatively, the frame rate may be increased, i.e., the rate at which each frame is displayed is increased or sped up. The frame-adjusted advertisement is displayed to the viewer in addition to the audio portion thereof. To ensure that the advertisement is understandable to the viewer, the audio portion may also be adjusted to account for the increased speed at which it is played. That is to say, the overall time needed to play a frame-adjusted advertisement is shortened as compared to a non-frame-adjusted advertisement. If the audio is to be played alongside the frame-adjusted advertisement, it must adjust its speed. It is well known, however, that audio played back at an increased speed causes the audio to be distorted and in some cases unintelligible to the listener. Therefore, mechanisms may be provided to adjust the audio to ensure that it is clear and understandable at the increased speed. In one example, the audio portion may be played at the increased speed, but may be dropped an octave (to make up for a so-called "chipmunk" effect). As another alternative, certain portions of the audio (e.g., non-essential portions that are pre-marked, such as using cues or metadata) may be selectively deleted.

The frame-adjusted advertisement may still be considered "viewed" by the viewer according to the previously discussed Nielsen standards. In particular, a custom version of the previously discussed NAVE audio watermark may be created and applied to the rate-adjusted advertisement. When the rate-adjusted advertisement is viewed, the watermark is identified and information relating thereto collected and/or transmitted such as to a headend entity and/or a NAVE unit. Alternatively, the watermark itself need not be altered; rather, the NAVE unit or other equipment may be configured to identify the watermark despite it being presented at an increased speed.

Information relating to whether the frame-adjusted advertisement has been viewed may be utilized as discussed above. For example, the information may be utilized, e.g., to determine eligibility for selective enablement of various features, to track a user's position within an advertisement story or series, to track a viewer's advertisement viewing history, to provide a mechanism for charging advertisers on a per-view basis, and/or to track "impression credits". These and other example uses are discussed in greater detail above.

It is further recognized that the foregoing functionality, i.e., the ability to cause a frame-adjusted advertisement and adjusted audio to be presented upon selection of a skip or fast-forward command is associated to advertising (secondary) content, and not programming (primary) content. In other words, during non-advertising portions of the program, the fast-forward or skip buttons work as usual (e.g., 2×, 4×, 8×, etc. with audio being dropped out). Hence, the present embodiment is further configured to identify, at the time of the skip or fast-forward request, whether the content being currently viewed is primary or secondary content. In one embodiment, this is accomplished by searching the program stream for SCTE 35 cues. If it is determined that the button press follows an SCTE 35 cue tone indicating the start of an advertisement, the foregoing mechanisms for frame adjusting and adjusting the audio of the advertisement are employed. Alternatively, if the button press follows an SCTE 35 cue tone indicating the end of an advertisement, the foregoing mechanisms are not employed and traditional fast-forward and skip mechanism are utilized.

In another embodiment, advertising and program content are separated using time coding enabled by the programmer prior to, or by a third party after the airing of, program content.

Premises DVR-Based Embodiments

In addition to the foregoing network-based storage implementations (e.g., using nDVR), various aspects of the disclosure may be implemented at the user's premises using their own recording equipment (e.g., premises DVR). In one such implementation, content is streamed over the network to the user, the content including secondary content such as advertisements or promotions. The user selects their DVR to record the streamed content (and secondary content) generally as in the prior art. However, in this implementation, the advertisement skipping and/or menu functionality discussed supra, are enabled on the user's CPE (e.g., on the DVR itself) such that subsequent interaction with the recorded content is subject the advertisement skipping/menu functions.

For example, in one variant, the user records the primary and secondary content on his/her DVR (such as when they are away at work), and then later accesses the stored content (stream). As the user attempts to fast-forward through the secondary content, the logic resident on the CPE (e.g., DVR, gateway, DSTB, or other CPE in communication therewith) either accesses either local or remote data relating the user's (or that CPE's) prior interaction or viewing with that particular secondary content, or alternatively their advertisement "credit" status. The secondary content may be identified using the NAVE approach discussed above, or alternatively via other means (such as an identifier or code embedded in the audio or video portion of the secondary content which can then be used to access a database for that user/CPE). If the user has met the acceptance criteria (e.g., has watched a sufficient portion of that same advertisement previously), then the trick mode function on the user's DVR is enabled, and the user can FF or skip the ad.

In another variant, the user is presented a menu such as that described above, and the user can select which option they prefer (e.g., save for later, skip, etc.); the menu is generated locally by the DVR/CPE and rendered on the user's viewing device (e.g., TV).

In yet another variant, the foregoing functions are combined; e.g., upon encountering an advertisement during FF operation, the user is presented with a menu enabling them to skip the advertisement if the foregoing evaluation of prior interaction (or "credits" as discussed supra) indicates such policy is to be enabled.

In one implementation, the DVR comprises mass storage (e.g., a SATA hard drive, or NAND flash memory), and the primary and secondary content are stored thereon, with the inclusion of markers that have been inserted into the program stream marking, inter alia, the beginning and end of each advertisement. The DVR is also equipped with the NAVE functionality previously described, such that it can identify advertisements as they are encountered, and use that information to determine the user's eligibility for certain selected functions (e.g., skip or FF). When the user in enabled for a "skip", the user selects this function on their DVR remote control (e.g., wireless remote), and the logic within the DVR (e.g., program stored in program memory or RAM of the DVR processing block) accesses that sector of the disk (or memory address) associated with the "end" cue or marker in the recorded content. In that accesses to HDDs or flash are rapid and may occur to any part of the storage in literally any order, advertisements that are recorded in a given lineal sequence relative to the primary content may accordingly be skipped, permuted in order, traded for one another etc. simply by accessing the different storage locations in a different sequence. Hence, numerous different temporal threads or branches can be created locally by the user based on his/her choices and/or prior interaction relative to each secondary content element (e.g., advertisement).

The foregoing functionality can, in one variant, be retrofitted onto extant premises DVRs simply through a software addition or download, and the transmission of the appropriate markers or cues in the content when transmitted by the network operator. On-screen displays of functions can also be used; e.g., instead of enabling the extant FF function on the user's DVR remote unit, an interactive on-screen menu can be used to provide the user functions for which there is no existing button (e.g., skip). This is especially true of touch-screen enabled devices such as tablet computers; e.g., a user streaming and recording content on their Wi-Fi enabled tablet (or viewing content recorded on their DVR and using the tablet to watch it while mobile); an application installed on the tablet in one embodiment provides the foregoing menu and/or advertisement enforcement functions, thereby relieving the network operator of providing this functionality at the headend as in some other embodiments described herein. Hence, a tablet user who is also an MSO subscriber can download the MSO's "app", which implements the enforcement/menu functions in relation to, e.g., trick modes used with respect to the MSO-provided content. In one such implementation, the user interaction, credit, and/or NAVE databases are retained locally on the DVR (or even the tablet itself) such that all of the evaluation can be performed locally at the user's premises. In other implementations, one or more of the foregoing databases are retained at a network storage location (e.g., server at the hub or headend), and the premises CPE messages the server with identifying information for the user (and advertisement at issue) to obtain the necessary policy/enforcement/credit information.

In another embodiment, a user who has initiated fast forward functionality during a program may be presented with an alternative advertisement as a semi-transparent "overlay", which may further be accompanied by alternative audio and/or interactive functionality related to such advertisement. For example, a "Drink Coca-Cola®" brand logo may appear during fast-forward, with audio "Drink Coca-Cola®. Press "A" to receive your coupon for a free Coke®."

Individualized Content Channel Variants

In another aspect, the foregoing techniques may be combined with personalized virtual or other content channel approaches to, inter alia, leverage data relating to user behavior on a per-user basis. See for example co-owned and co-pending U.S. patent application Ser. No. 12/414,554 filed Mar. 30, 2009 entitled "Personal Media Channel Apparatus and Methods" which is incorporated herein by reference in its entirety, which discloses methods and apparatus for "fused" targeted content delivery in a content-based network. Specifically, a substantially user-friendly mechanism for viewing content compiled from various sources is provided, including, inter alia, DVR, broadcast, VOD, Start Over, etc. Content selected to align with a user's preferences is displayed as a substantially continuous stream as part of a "virtual" user-based channel. In one embodiment, a user profile is constructed and targeted content gathered without requiring any user intervention whatsoever; e.g., based on a user's past or contemporaneous interactions with respect to particular types of content. This information can be generated by, for example, a recommendation "engine" such as that described in co-owned U.S. patent application Ser. No. 12/414,576 filed Mar. 30, 2009 entitled "Recommendation Engine Apparatus and Methods", and issued as U.S. Pat No. 9,215,423 on Dec. 15, 2015, which is also incorporated herein by reference in its entirety. The "virtual channel" acts as a centralized interface for the user and their content selections and preferences, as if the content relevant to a given user were in fact streamed over one program channel. The compiled content may also presented to the user in the form of a "playlist" from which a user may select desired content for viewing and/or recording. The user is able to navigate between on-demand content, the virtual channel, an EPG, a search tool, and a DVR navigation tool from a single user interface (e.g., on-screen display).

In another aspect, client applications (e.g., those disposed on a subscriber's CPE and/or network servers) are utilized to compile the playlist based on user-imputed as well as pre-programmed user profiles. Various feedback mechanisms may also be utilized to enable the client application to "learn" from the user's activities in order to update the user profile and generate more finely-tuned and cogent recommendations. Client applications may also be utilized to manage the seamless presentation of content on the virtual channel, and locate/flag various scenes inside selected content for user viewing or editing.

Accordingly, in one variant, targeted advertising or promotions may be selectively inserted or enforced within the programming for the aforementioned virtual personalized channel. Specifically, by knowing the particular prior behavior of a particular user, more accurate "mapping" of advertisement or promotion enforcement to each individual user may be accomplished.

CPE

Figure 6:
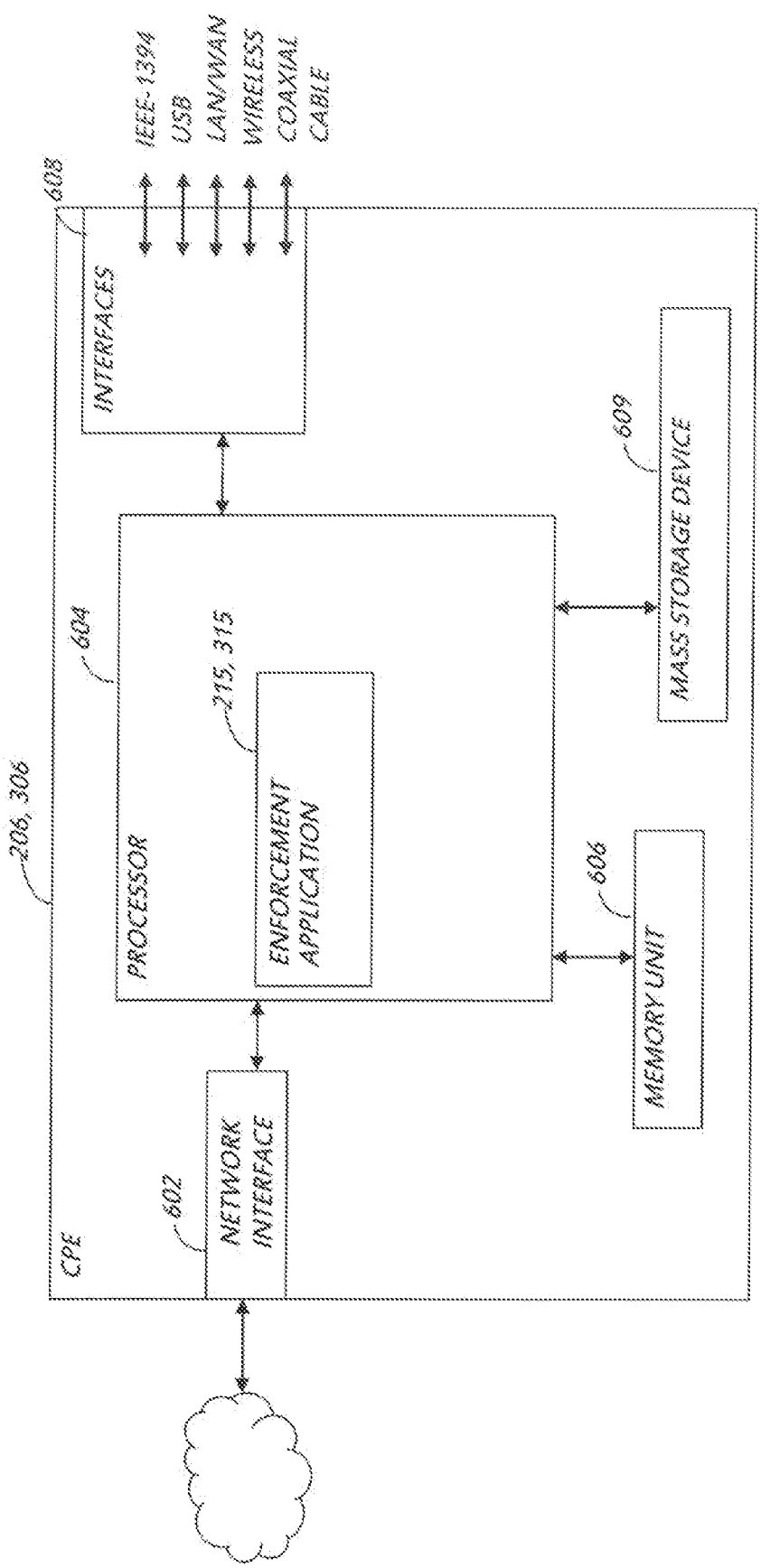
FIG. 6 is a functional block diagram illustrating an exemplary embodiment of CPE adapted to support selective functional enablement according to the disclosure.

FIG. 6 illustrates an exemplary embodiment of the improved CPE according to the present disclosure.

Figure 1D:
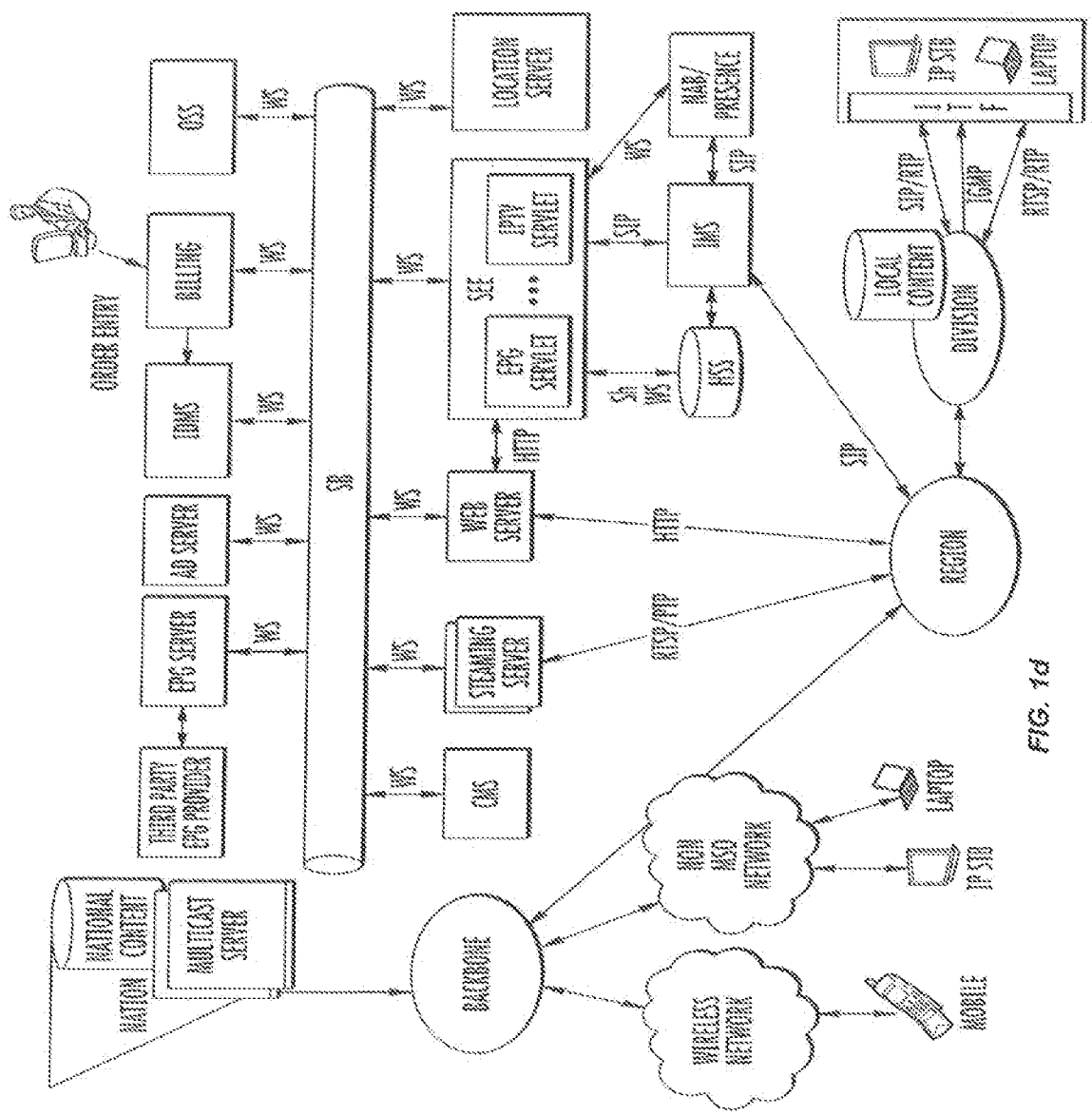
FIG. 1d is a functional block diagram illustrating one exemplary packetized content delivery network architecture useful with the present disclosure.

As shown in the simplified diagram of FIG. 6, the exemplary device 206, 306 generally comprises an Open-Cable (OCAP)-compliant embedded system having an RF front end 602 (including tuner and demodulator/decryptors) for interface with the HFC network 101 of FIGS. 1-1d, digital processor(s) 604, storage device (memory) 606, and a plurality of interfaces 608 (e.g., video/audio interfaces, IEEE-1394 "Firewire" or Thunderbolt™, USB, serial/parallel ports, etc.) for interface with other end-user apparatus such as televisions, personal electronics, computers, Wi-Fi or other network hubs/routers, etc. A mass storage device 609 (e.g. HDD or the like) may also be provided, and can be used for, e.g., DVR storage of content, storage of the local watermark database 304, etc.

Other components which may be utilized within the device (deleted from FIG. 6 for simplicity) include various processing layers (e.g., DOCSIS MAC or DAVIC OOB channel, MPEG, etc.) as well as media processors and other specialized SoC or ASIC devices. The CPE 206, 306 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The CPE of FIG. 6 is also provided with an OCAP 1.0-compliant application and Java-based middleware which, inter alia, manages the operation of the device and applications running thereon (including the aforementioned client software process where used). It will be recognized by those of ordinary skill that myriad different device and software architectures may be used consistent with the selective enforcement functions of the present disclosure, the device of FIG. 6 being merely exemplary. For example, different middlewares (e.g., MHP, ARIB, or ACAP) may be used in place of the OCAP middleware of the illustrated embodiment.

The exemplary CPE further comprises a conventional "Watch TV" application or the like, which services those program or user channels available over the network. The Watch TV application, residing in memory, provides such functions as channel navigation control, channel selection in response to a channel change event, etc. In one embodiment, the Watch TV (or EPG) application further comprises all necessary functionality need to support the data collection client process.

In another embodiment, the CPE 206, 306 comprises a converged premises device, such as for example that described in co-owned U.S. patent application Ser. No. 11/378,129 filed Mar. 16, 2006, entitled "METHODS AND APPARATUS FOR CENTRALIZED CONTENT AND DATA DELIVERY", and issued as U.S. Pat. No. 8,347,341 on Jan. 1, 2013, incorporated herein by reference in its entirety.

As previously noted, the CPE of FIG. 6 further comprises in one embodiment a client application or module configured to collect and/or transmit data, in the form of, e.g., a software application running on the CPE. This software application may be configured to perform any number of functions relating to selective advertising or promotion delivery and enforcement, including without limitation: (i) identifying delivered secondary content having watermarking or other coding contained therein; (ii) extracting the watermark or coded information, and (iii) utilizing the extracted information to facilitate selective enforcement. For example, in one variant (corresponding to the network-centric variant discussed supra), the client device application is configured to send the extracted watermark information (e.g., NAVE audio encoding) to a network entity such as a headend server, so as to permit the headend server or other headend entity to identify the associated content (and hence update the database as to "watched" events for the relevant CPE).

Alternatively, the client application/CPE may be configured with more innate intelligence, such as where the aforementioned content identification (if used) is performed at the CPE (such as via a locally stored database, lookup table, or other data structure); subsequently, data reflecting this identification is passed up to the headend for implementation of relevant enforcement policies based on the data.

As yet another configuration, the CPE/application may be configured to actually make selective enforcement decisions locally (such as via a locally stored advertisement identification database, and stored history of the user/CPE activities), and pass the decision to the server or other responsible network entity, or even implement the decision itself (as in FIG. 3 herein).

Moreover, it will be appreciated that while primary embodiments of the methods and network/client apparatus set forth herein are described, wherein the network side (e.g., headend) enforces policies relating to secondary content viewing with respect to "cloud" based storage and delivery paradigms (e.g., Start Over or Look Back functions), the various aspects of the disclosure may be applied to locally stored content; e.g., that stored on a premises DVR. While most DVR implementations generally do not enforce any sort of rules or restrictions regarding trick modes or playback of recorded secondary content, it is appreciated that substantial utility may nonetheless be derived from the application of the principles of the present disclosure in such cases. For example, a user of the premises DVR may not remember that they previously watched a given ad, and hence could in one implementation be alerted (e.g., via on-screen icon, message, audible tone, etc.) that the advertisement they are watching has already been viewed, at which point they could FF or skip the advertisement (or decide that they want to see it again).

Any data of interest may be directly transmitted from the CPE ("pushed") to the upstream entity (e.g., server, or software portion, such as via an OOB message or other communication), or stored or logged in a file and sent when requested or "pulled" by the network entity (or according to other models, such as being sent periodically, on CPE startup, etc.).

The CPE 106 may also be in communication with, or may itself constitute, a mobile device, such as a wireless-enabled smartphone, tablet computer, laptop computer, etc. For example, in one variant of the CPE (not shown), the CPE is a tablet computer enabled for wireless (e.g., Wi-Fi) communication with a hotspot (802.11 AP), such that the user can receive MSO-originated nDVR, Look Back, Start Over, etc. services at the tablet device, and any trick mode functions (such as FF or skip) can be selectively enforced on the tablet (as if it was the user's premises CPE).

Business Methods and Rules Engine

Various exemplary business-related aspects of present disclosure are now described in greater detail, along with exemplary embodiments of a "rules engine".

Specifically, in another aspect of the disclosure, the aforementioned selective enforcement architectures (e.g., including one or more computer programs) optionally include an entity having an operations and/or business rules "engine". This engine comprises, in an exemplary embodiment, a series of software routines that are adapted to control the enforcement of functions (e.g., trick modes on stored secondary content). These rules may also be fully integrated within the aforementioned one or more computer programs and be controlled via the entity on which the program is run, which may be for instance the network server 202 of the architecture 200 of FIG. 2, or alternatively on the CPE 306 of the architecture 300 of FIG. 3. In effect, the rules engine comprises a supervisory entity which monitors and selectively controls the selective enablement of the foregoing functions at a higher level, so as to implement desired operational or business rules of the MSO or other parties of interest (e.g., advertisers or promoters).

The rules engine can be considered an overlay of sorts to the algorithms of the previously described computer applications. For example, the exemplary computer application may invoke certain operational protocols or decision processes based on data received (e.g., prior history of viewing of certain secondary content), as well as network operational or historical data, demographic data, geographic data, etc. However, these processes may not always be compatible with higher-level business or operational goals, such as maximizing profit on a network-wide basis (or after consideration of other factors not examined by the collecting entities such as advertising revenue, RTA/acquisition costs, "costs" of delivering streams based on required bandwidth, taxes, maintenance or repair costs, additional equipment leasing or use costs, etc.), or system reliability and/or flexibility. As but one example, a user may have already viewed a given ad, and hence qualifies to FF or skip it, but where the advertisement is flagged of one of importance or significance to the advertiser, or which has a dynamic temporal or demographic component (e.g., is varied as a function of time/date, or has a particular demographic relevance), the rules engine may override the selective enablement and force the user to watch it again. Similarly, where the user has affirmatively or passively indicated a preference for certain types of content, the rules engine may selectively override the selective enablement or disablement decisions.

Per user/CPE data may also be considered in the selective enforcement logic; e.g., if a given user or CPE historically does not FF or skip advertisements even when enabled to do so, it can be inferred that the associated user has a relatively high "threshold for advertising pain", and hence all or a portion of the advertisements that would otherwise be selectively enabled are not.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure herein.

While the above detailed description has shown, described, and pointed out novel features of the disclosure as applied to various embodiments, it will be understood that various omissions, substitutions, and changes in the form and details of the device or process illustrated may be made by those skilled in the art. The foregoing description is of the best mode presently contemplated. This description is in no way meant to be limiting, but rather should be taken as illustrative of the general principles of the disclosure. The scope of the disclosure should be determined with reference to the claims.

What is claimed is:

1. Computer readable apparatus comprising a non-transitory storage medium, the non-transitory storage medium comprising at least one computer program having a plurality of instructions, the plurality of instructions configured to, when executed on a processing apparatus, cause a computerized apparatus to:

cause storage of digital content in a storage apparatus;

algorithmically evaluate the stored digital content to obtain first data;

utilize at least the obtained first data to identify digital secondary content;

determine a policy to apply to the digital secondary content;

generate second data enabling the application of the determined policy to the digital secondary content; and cause delivery of the digital content and the digital secondary content to a computerized client device via a digital content stream, the digital content stream comprising the second data, wherein at least the second data enables a user of the computerized client device to drag, via touch screen input, a thumbnail of the digital secondary content to place the digital secondary content at one or more of the following positions: (i) between two or more portions of the digital content to have the digital secondary content played thereat, or (ii) before a beginning of the digital content, wherein one or more restrictions exist for placement of the digital secondary content at an end of the digital content, such that the user can choose when to view the digital secondary content only at the beginning of, or during, playback of the digital content.

2. The computer readable apparatus of claim 1, wherein the causation of the storage of the digital content in the storage apparatus comprises causation of storage in a cloud-based storage apparatus, the cloud-based storage apparatus comprising a plurality of discrete storage apparatus disposed at different physical locations but logically operative as a single storage device.

3. The computer readable apparatus of claim 2, wherein the plurality of instructions are further configured to, when executed on the processing apparatus, cause the computerized apparatus to:
 enable data communication with a database, the database comprising a plurality of identifying data stored thereon; and
 based at least in part on identification of a bit-wise match of identifying data within the database and identifying data embedded in the stored digital content, cause enablement of one or more digital content rendering or control functions associated with rendering or control respectively, of the digital secondary content.

4. The computer readable apparatus of claim 1, wherein the determined policy comprises a policy to enable the user of the computerized client device to store the digital secondary content in a cloud-based storage apparatus to view at a future time.

5. The computer readable apparatus of claim 1, wherein the digital content stream comprises the second data, the second data comprising an in-stream marker which enables the user of the computerized client device to skip the digital secondary content.

6. The computer readable apparatus of claim 1, wherein the determination of the policy is based at least in part on a criterion related to a previous interaction with the digital secondary content by another computerized device associated with the user.

7. The computer readable apparatus of claim 1, wherein the determined policy comprises an ability to replace the digital secondary content with different digital secondary content, the replacement of the digital secondary content comprises replacement of a prescribed portion of the digital secondary content.

8. Computerized apparatus configured to enable or disable one or more digital content control functionalities, the computerized apparatus comprising:
 a data interface;
 digital processor apparatus in data communication with the data interface; and
 storage apparatus in data communication with the digital processor apparatus, the storage apparatus comprising at least one computer program having a plurality of instructions, the plurality of instructions configured to, when executed on the digital processor apparatus, cause the computerized apparatus to:
  receive secondary digital content via the data interface and from a content source in data communication with the computerized apparatus;
  process the secondary digital content to extract first data characterizing the secondary digital content with respect to at least one attribute thereof;
  cause search of a database based on the extracted first data to identify policy data, the identified policy data descriptive of at least one policy to apply to the secondary digital content for rendering;
  generate second data relating to the application of the at least one policy to the secondary digital content for the rendering, the at least one policy enabling the one or more digital content control functionalities associated with the rendering of the secondary digital content, the one or more digital content control functionalities comprising at least one of (i) a fast forward function, or (ii) a skip function;
  based on a selection, by a user of at least one computerized client device, of the at least one of (i) the fast forward function or (ii) the skip function:
   (a) adjust at least one of a frame rate or speed of a playback of a video portion of the secondary digital content;
   (b) perform at least one of: (1) increased speed of an audio portion of the secondary digital content at a lower octave than an original version of the audio portion, or (2) delete one or more non-essential portions of the original version of the audio portion; and
   (c) provide the adjusted video and audio portions of the secondary digital content to the user, the adjusted video and audio portions of the secondary digital content creating an impression for the secondary digital content.

9. The computerized apparatus of claim 8, wherein the processing of the secondary digital content comprises processing to identify data indicating that the secondary digital content has been previously rendered at the at least one computerized client device, and the at least one policy is based on thereon.

10. The computerized apparatus of claim 8, wherein the secondary digital content comprises a prescribed relationship with other digital content, the other digital content rendered via the at least one computerized client device prior to the receipt of the secondary digital content.

11. The computerized apparatus of claim 8, wherein:
 the at least one policy comprises enabling a user to, via a computerized client device, render the secondary digital content in a window overlaid over a portion of primary digital content being rendered by the computerized client device, such that the user can view the secondary digital content in parallel with the primary digital content; and
 the window is moveable within a display apparatus of the computerized client device.

12. The computerized apparatus of claim 8, wherein the second data comprises data configured to present one or more options to the user of the at least one computerized client device which enable the user to denote the secondary digital content as belonging to a category of relevance to the user.

13. The computerized apparatus of claim 12, wherein the plurality of instructions are further configured to, when executed on the digital processor apparatus, cause the computerized apparatus to:

recommend other secondary digital content more similar to the secondary digital content or less similar to the secondary digital content based on the denotation of the secondary digital content as belonging to the category of relevance to the user.

14. The computerized apparatus of claim 8, wherein the one or more non-essential portions are indicated via use of at least one of (i) one or more cues or (ii) metadata.

15. The computerized apparatus of claim 8, wherein the functions of (a)-(c) are performed based on a determination that the selection of the at least one of (i) the fast forward function or (ii) the skip function follows an indication of a start of the secondary digital content.

16. A computerized method of enabling one or more content rendering functions for a computerized client device within a content distribution network, the computerized method comprising:
   evaluating digital content being rendered by the computerized client device to identify secondary digital content;
   utilizing client software configured to execute on the computerized client device to collect advertisement viewing data, wherein the utilizing of the client software configured to execute on the computerized client device to collect the advertisement viewing data comprises:
   (i) utilizing the client software configured to execute on the computerized client device to download first advertisement viewing data associated with at least one other computerized client device when the computerized client device is within a wireless range of the at least one other computerized client device;
   (ii) causing the first advertisement viewing data associated with the at least one other computerized client device to be combined with second advertisement viewing data of the computerized client device, thereby generating combined advertisement viewing data in a data structure; and
   (iii) causing transmission of the data structure to a computerized network apparatus; determining a policy to apply to the rendering of the secondary digital content, wherein the determining of the policy is based on determining, based on the combined advertisement viewing data, that at least the portion of the secondary digital content has been previously rendered by the computerized client device; and
   applying the determined policy to the rendering of the secondary digital content, the applying the determined policy to the rendering of the secondary digital content comprising enabling a user of the computerized client device to accrue data representative of credits via the rendering of the secondary digital content, wherein rendering of the secondary digital content during at least one first time period accrues more credits than rendering of the secondary digital content during at least one second time period.

17. The computerized method of claim 16, wherein the applying of the determined policy to the rendering of the secondary digital content comprises providing an option for the user of the computerized client device to access at least one of (i) a mechanism to purchase a product associated with the secondary digital content, or (ii) a discount to apply for the purchase of the product.

18. The computerized method of claim 16, wherein the applying of the determined policy to the rendering of the secondary digital content comprises causing an overlay of the secondary digital content over at least a portion of the digital content being rendered.

19. The computerized method of claim 16, wherein the one or more content rendering functions comprises at least one trick mode function; and the computerized method further comprises:
   based on receiving a request for performance of the at least one trick mode function, (i) adjusting a frame rate of a video portion of the secondary digital content, (ii) adjusting an audio portion of the secondary digital content, and (iii) causing the adjusted audio and video portions to be delivered to the computerized client device.

20. The computerized method of claim 16, wherein the at least first time period comprises at least one time period associated with prime time, and the at least second time period comprises at least one time period associated with non-prime time.

* * * * *